(12) United States Patent
Santana et al.

(10) Patent No.: US 11,167,350 B2
(45) Date of Patent: Nov. 9, 2021

(54) DROPLET-BASED MICROREACTORS FOR NANOPARTICLES

(71) Applicant: THE TRUSTEES OF INDIANA UNIVERSITY, Bloomington, IN (US)

(72) Inventors: Joshua S. Santana, Bloomington, IN (US); Sara E. Skrabalak, Bloomington, IN (US)

(73) Assignee: The Trustees of Indiana University, Bloomington, IN (US)

(*) Notice: Subject to any disclaimer, the term of this patent is extended or adjusted under 35 U.S.C. 154(b) by 415 days.

(21) Appl. No.: 16/390,439

(22) Filed: Apr. 22, 2019

(65) Prior Publication Data
US 2019/0321895 A1 Oct. 24, 2019

Related U.S. Application Data

(60) Provisional application No. 62/661,135, filed on Apr. 23, 2018.

(51) Int. Cl.
*B01J 19/00* (2006.01)
*B01J 19/24* (2006.01)
(Continued)

(52) U.S. Cl.
CPC .......... *B22F 9/24* (2013.01); *B01J 19/0093* (2013.01); *B01J 2219/0086* (2013.01); *B01J 2219/00813* (2013.01); *B01J 2219/00826* (2013.01); *B01J 2219/00833* (2013.01); *B01J 2219/00862* (2013.01); *B01J 2219/00873* (2013.01); *B01J 2219/00894* (2013.01); *B22F 2301/255* (2013.01); *B22F 2304/05* (2013.01)

(58) Field of Classification Search
CPC ........ B01J 19/00; B01J 19/0093; B01J 19/24; B01J 2219/00; B01J 2219/00781; B01J 2219/00788; B01J 2219/00792; B01J 2219/00795; B01J 2219/00801; B01J 2219/0081; B01J 2219/00813; B01J 2219/001819; B01J 2219/00824; B01J 2219/00826; B01J 2219/00833; B01J 2219/00851; B01J 2219/00858; B01J 2219/0086; B01J 2219/00862; B01J 2219/00873; B01J 2219/00889; B01J 2219/00891; B01J 2219/00894; B01J 2219/00903; B01J 2219/0095; B01J 2219/00952; B01J 2219/00954; B01J 2219/00959; B01J 2219/00961; B22F 9/00; B22F 9/16; B22F 9/18; B22F 9/24; B22F 2001/00; B22F 2001/0003; B22F 2001/0007; B22F 2001/0011; B22F 2001/0018; B22F 2001/0037; B22F 2999/00; B22F 2301/00; B22F 2301/25; B22F 2301/255; B22F 2304/00
See application file for complete search history.

(56) References Cited

U.S. PATENT DOCUMENTS 8,563,325 B1 * 10/2013 Bartsch ............ B01L 3/502776
436/180

* cited by examiner

*Primary Examiner* — Natasha E Young
(74) *Attorney, Agent, or Firm* — Barnes & Thornburg LLP

(57) ABSTRACT

Different Au—Pd nanoparticles, ranging from sharp-branched octopods to core@shell octahedra, can be achieved by inline manipulation of reagent flowrates in a microreactor for seeded growth. Significantly, these structures represent different kinetic products, demonstrating an inline control strategy toward kinetic nanoparticle products that should be generally applicable.

20 Claims, 30 Drawing Sheets

(51) Int. Cl.
*B22F 9/00* (2006.01)
*B22F 9/16* (2006.01)
*B22F 9/18* (2006.01)
*B22F 9/24* (2006.01)

| FIGURE 2 PARTICLES | HCL FLOWRATE (mL/hr) | [HCL] | Au SEEDS FLOWRATE (mL/hr) | [Au] OCTAHEDRA | METAL PRECURSOR FLOWRATE (mL/hr) | [HAuCl$_4$] | [H$_2$PdCl$_4$] | [CTAC] | [NaBr] | [L-aa] |
|---|---|---|---|---|---|---|---|---|---|---|
| A1 | 0 | 0 mM | 0.1 | 15.4 µM | 0.30 | 0.44 mM | 87.7 µM | 35.5 mM | 10.2 mM | 46.2 mM |
| B1 | 0.20 | 38.5 mM | 0.1 | 15.4 µM | 0.20 | 0.30 mM | 58.4 µM | 23.7 mM | 6.83 mM | 46.2 mM |
| C1 | 0.30 | 57.7 mM | 0.1 | 15.4 µM | 0.15 | 0.22 mM | 43.8 µM | 17.7 mM | 5.12 mM | 46.2 mM |
| D1 | 0.40 | 76.9 mM | 0.1 | 15.4 µM | 0.10 | 0.15 mM | 29.2 µM | 11.8 mM | 3.42 mM | 46.2 mM |
| E1 | 0.58 | 111.5 mM | 0.1 | 15.4 µM | 0.01 | 14.7 µM | 2.9 µM | 1.18 mM | 0.34 mM | 46.2 mM |

| FIGURE 2 PARTICLES | HCL FLOWRATE (mL/hr) | [HCL] | Au SEEDS FLOWRATE (mL/hr) | [Au] OCTAHEDRA | METAL PRECURSOR FLOWRATE (mL/hr) | [HAuCl$_4$] | [H$_2$PdCl$_4$] | [CTAC] | [NaBr] | [L-aa] |
|---|---|---|---|---|---|---|---|---|---|---|
| A2 | 0 | 0 mM | 0.05 | 7.70 µM | 0.325 | 0.48 mM | 95.0 µM | 38.5 mM | 11.1 mM | 46.2 mM |
| B2 | 0.20 | 38.5 mM | 0.05 | 7.70 µM | 0.225 | 0.33 mM | 65.8 µM | 26.6 mM | 7.68 mM | 46.2 mM |
| C2 | 0.30 | 57.7 mM | 0.05 | 7.70 µM | 0.175 | 0.26 mM | 51.2 µM | 20.7 mM | 5.98 mM | 46.2 mM |
| D2 | 0.40 | 76.9 mM | 0.05 | 7.70 µM | 0.125 | 0.18 mM | 36.5 µM | 14.8 mM | 4.20 mM | 46.2 mM |
| E2 | 0.58 | 111.5 mM | 0.05 | 7.70 µM | 0.035 | 51.6 µM | 10.2 µM | 4.14 mM | 1.20 mM | 46.2 mM |

*FIG. 6*

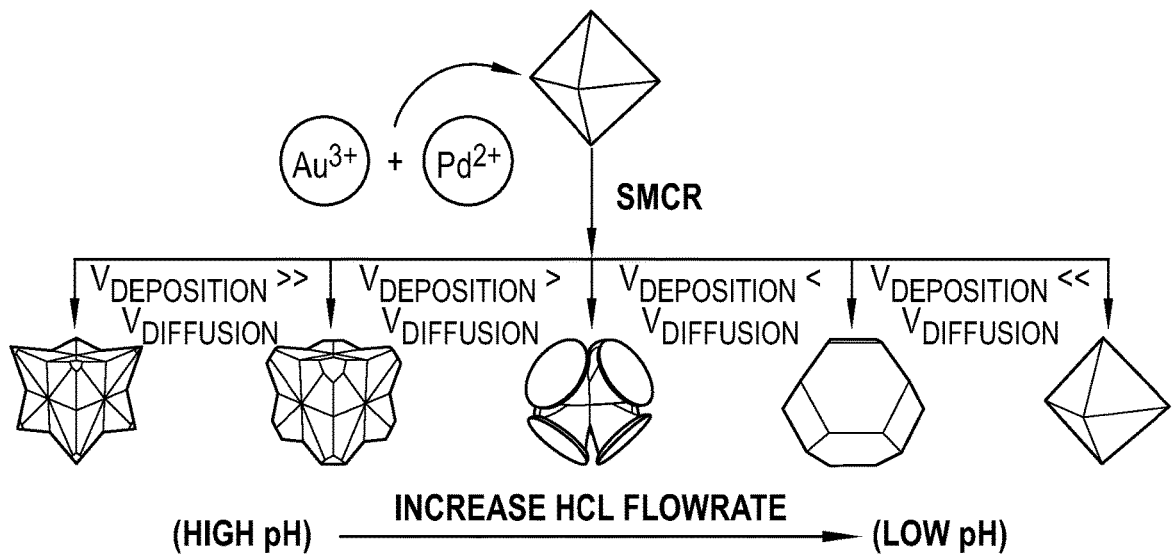
FIG. 9
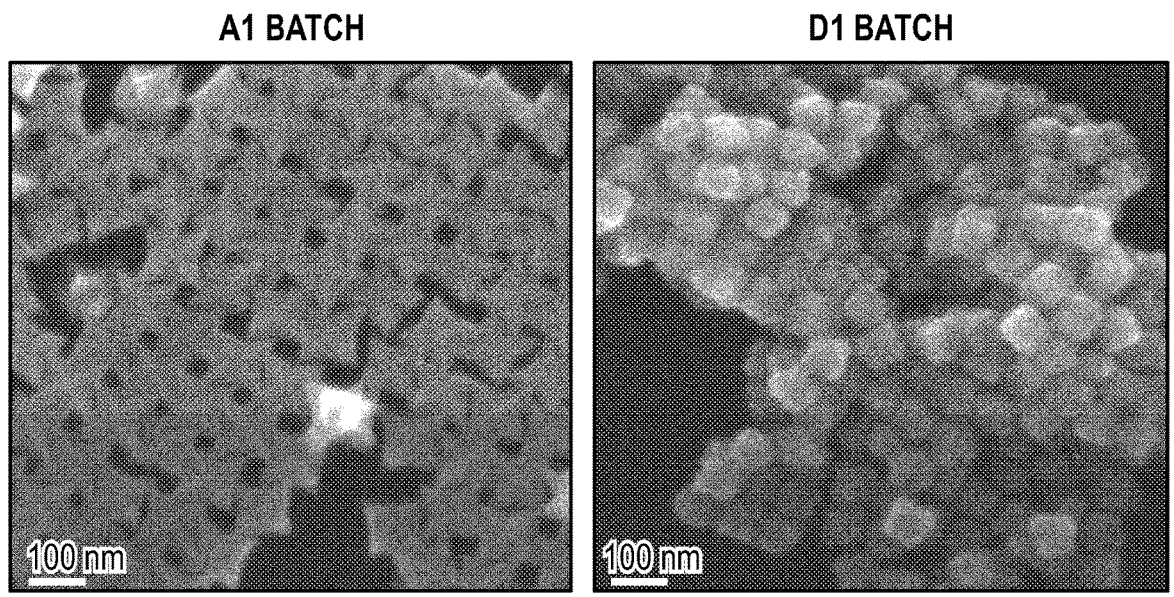
A1 TIP TO TIP LENGTH
MICROREACTOR= 134.69 ± 10.59 nm
BATCH= 156.24 ± 6.29 nm
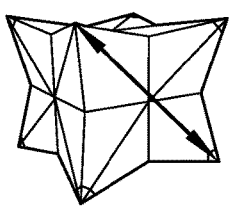
FIG. 10

| Pd:Au FLOWRATE RATIO | Pd FLOWRATE (mL/hr) | Au FLOWRATE (mL/hr) | H$_2$PdCl$_4$ (mM) | CTAC (mM) | NaBr (mM) | L-AA (mM) | Au (mM) | Au YIELD (μmol/hr) |
|---|---|---|---|---|---|---|---|---|
| 1:2 | 0.2 | 0.4 | 0.14 | 41.14 | 18.51 | 1.43 | 0.35 | 0.24 |
| 1:1 | 0.3 | 0.3 | 0.21 | 61.71 | 27.77 | 1.43 | 0.26 | 0.18 |
| 2:1 | 0.4 | 0.2 | 0.29 | 82.29 | 37.03 | 1.43 | 0.17 | 0.12 |
| 5:1 | 0.5 | 0.1 | 0.36 | 102.86 | 46.29 | 1.43 | 0.086 | 0.06 |

*FIG. 13*

| Pd:Au FLOWRATE RATIO | Pd FLOWRATE (mL/hr) | Au FLOWRATE (mL/hr) | H$_2$PdCl$_4$ (mM) | CTAC (mM) | L-AA (mM) | Au (mM) | Au YIELD (μmol/hr) |
|---|---|---|---|---|---|---|---|
| 1:2 | 0.2 | 0.4 | 0.14 | 41.14 | 1.43 | 0.38 | 0.27 |
| 1:1 | 0.3 | 0.3 | 0.21 | 61.71 | 1.43 | 0.29 | 0.20 |
| 2:1 | 0.4 | 0.2 | 0.29 | 82.29 | 1.43 | 0.19 | 0.13 |
| 5:1 | 0.5 | 0.1 | 0.36 | 102.86 | 1.43 | 0.096 | 0.07 |

*FIG. 14*

Au NANOCUBES    Au OCTAHEDRA

— 50 nm

| OVERGROWTH REACTIONS: | SYRINGE 3 | SYRINGE 4 | SYRINGE OIL 2 | KBr (mM) | L-aa (mM) | PVP (mM) | Na$_2$PtCl$_4$ (mM) | HAuCl$_4$ (mM) |
|---|---|---|---|---|---|---|---|---|
| FIGURE 2B | Na$_2$PtCl$_4$, PVP | KBr, Laa, PVP | SILICONE OIL | 0.1 | 2.2 | 3.1 | 2.1 | N/A |
| FIGURE 2C | Na$_2$PtCl$_4$, PVP | KBr, Laa, PVP | SILICONE OIL | 0.1 | 6.6 | 3.1 | 6.2 | N/A |
| FIGURE 2D | Na$_2$PtCl$_4$, PVP | KBr, Laa, PVP | SILICONE OIL | 0.1 | 11 | 3.1 | 10.4 | N/A |
| FIGURE 2E | Na$_2$PtCl$_4$, PVP | KBr, Laa, PVP | SILICONE OIL | 0.1 | 15.4 | 3.1 | 14.5 | N/A |
| FIGURE 2F | Na$_2$PtCl$_4$, PVP | KBr, Laa, PVP | SILICONE OIL | 0.1 | 19.8 | 3.1 | 18.6 | N/A |
| FIGURE 4 (Au) | HAuCl$_4$, PVP | KBr, Laa, PVP | SILICONE OIL | 0.1 | 2.2 | 3.1 | N/A | 2.1 |
| FLOWRATE S (mL/h) | 1.8 | 1.8 | 9.5 | | | | | |

FIG. 31

| PD SEED REACTION: | SYRINGE 1 | SYRINGE 2 | SYRINGE OIL | KBr (mM) | L-aa (mM) | PVP (mM) | Na$_2$PdCl$_4$ (mM) |
|---|---|---|---|---|---|---|---|
| FIGURE 2A | KBr, L-aa, PVP | Na$_2$PdCl$_4$, PVP | SILICONE OIL | 305.5 | 87.8 | 208.6 | 17.5 |
| FLOWRATES (mL/h): | 1.8 | 1.8 | 1.2 | | | | |

*FIG. 39*

DROPLET-BASED MICROREACTORS FOR NANOPARTICLES

CROSS-REFERENCE TO RELATED APPLICATIONS

This application claims priority under 35 U.S.C. § 119(e) to U.S. Provisional Patent Application Ser. No. 62/661,135, filed Apr. 23, 2018, which is expressly incorporated by reference herein.

GOVERNMENT LICENSE RIGHTS

This invention was made with government support under 1602476 awarded by National Science Foundation. The government has certain rights in the invention.

BACKGROUND

Metal nanoparticles (NPs) have unique optical and chemical properties that arise from their composition, crystallite size, and shape, allowing for diverse applications. Bimetallic NPs similarly display size- and shape-dependent properties, where the specific bimetallic distribution contributes to their properties. Nanostructures with different compositional and structural features represent different kinetic and thermodynamic products and can be accessed through different synthetic conditions. Thermodynamic products are the most stable, but kinetic products can be readily accessed through pathways with lower activation energies, with Wulff polyhedra representing the thermodynamic NP shape for face-centered cubic metals under idealized conditions. Kinetic products deviate from this global minimum structure and typically arise in nanosyntheses when the deposition rate of adatoms is much faster the rate of adatom diffusion. This condition kinetically traps atoms in high energy positions. Seed-mediated co-reduction (SMCR) is a versatile method to synthesize multimetallic kinetic products.

In SMCR, multiple metal precursors are co-reduced simultaneously in solution to deposit the metals on shape-controlled seeds. For example, in a model Au—Pd system, a range of products were accessed by varying the pH of the reaction and metal precursors concentrations, including branched nanocrystals and more thermodynamically favorable core@shell nanocrystals. The embodiments described herein report the synthesis of Au—Pd nanocrystals by SMCR but with a continuous flow microdroplet reactor, where kinetic control is achieved by inline manipulation of droplet pH and precursor concentrations through controlling relative flowrates. Significantly, this inline control strategy toward kinetic nanocrystal products should be generally applicable to other nanosyntheses.

Microdroplet reactors are a way to synthesize large product volumes of nanomaterials through continuous production of uniform reaction droplets in a two-phase flow. Microreactors offer advantages to batch reactions that include maintenance of thermal equilibrium within droplets, scale-up abilities for product volume, control of mass transport, and even in situ spectroscopic analysis through absorbance, fluorescence, and X-ray monitoring. These conditions favor formation of highly uniform products and can give important mechanistic insight into nanomaterial formation. Even with the promise of microreactors, few nanosyntheses have been demonstrated with them and the utility of inline manipulation to access a variety of structures is largely unexplored.

Metal nanoparticles (NPs) have diverse chemical and physical properties that arise from differences in composition, crystallite size, and NP shape. Because of this diversity, metal NPs are excellent candidates for applications in catalysis, plasmonics, nanomedicine, and more. In addition to their size- and shape-dependent properties, bimetallic nanostructures display properties that depend on the overall NP architecture (i.e., how the two metals are distributed relative to one another). The ability to precisely control the composition and structure of bimetallic NPs through synthesis is important to achieving desired properties.

Typically, bimetallic NPs are synthesized in batch reactions due to their easy reaction setup, the ability to manipulate reaction conditions facilely, and the propensity toward monodisperse products. However, there are limitations when trying to synthesize such NPs at large scale in batch reactors. These limitations arise from difficulty in maintaining thermal equilibrium during synthesis. The ability to maintain constant temperature is important in bimetallic NP syntheses because otherwise a variety of kinetic products (NPs with different shapes and architectures) are achievable. That is, subtle temperature gradients in large reaction vessels can lead to polydisperse products ranging from branched NPs to conformal NPs, with a variety of structures in between.

SUMMARY

Recent studies showed that the relative flowrates of reagents in microdroplet reactors could be manipulated to achieve core@shell nanostructures with different shell thicknesses. Also, different nanostructures have been synthesized inline by varying stock solutions as well as reaction temperature and/or residence time in flow reactors. The disclosed embodiments demonstrate that different bimetallic kinetic products can be readily accessed by SMCR through inline manipulation of relative flowrates of reagent solutions. This ability is demonstrated with the SMCR synthesis of shape-controlled Au—Pd NPs, with the flow approach being adapted from batch reactions where shapes were manipulated by varying the pH within the reaction droplets through the delivery of different amounts of hydrochloric acid (HCl). Specifically, by adjusting the flow-rate of HCl relative to the flow-rate of the Au and Pd metal precursors, products that vary from sharply branched octopods to core@shell structures were possible. The microreactor confines the reactions into 10 µL droplets, with the carrier medium being injected at a rate of 1-2 times faster than the additive flowrate of the reagent materials to ensure uniform droplets. These results demonstrate that nanomaterial shape can be manipulated inline by changing the relative flow-rates of reagent materials using a microreactor, without using the typical kinetic manipulation of changing temperature or residence time.

Microreactors for nanoparticle (NP) synthesis offer advantages over batch reactions in terms of scale-up and integration with online analyses. In some embodiments, two microreactors (i.e., a duo-microreactor) are integrated to achieve sequential reactions for the synthesis of multimetallic NPs with architectural control. The generality of the duo-microreactor is shown with the synthesis of branched Pd—Pt NPs and core@shell Pd@Au NPs, both achieved by synthesizing Pd nanocubes in the first part of the microreactor and then using those nanocubes downstream as seeds for Pt or Au deposition. Control of the dimensions of these NPs was further demonstrated and achieved by tailoring metal precursor concentrations inline. This microreactor methodology is anticipated to be applicable to other multi-metallic NP systems.

According to an aspect of the disclosure, a microreactor may include a plurality of syringes. Each syringe may be placed on a syringe pump. Tubing may be connected to each syringe. Capillaries may be connected to the tubing. An end of the capillaries may meet at an injector site of a respective syringe. The tubing may be positioned in a heating element to heat the tubing so that droplets from the tubing may be collected in a centrifuge vial after exiting the tubing.

In some embodiments, the plurality of syringes may include four syringes. Three of the four syringes may contain reagents and one of the syringes may contain silicone oil. A first reagent may include H2PdCl4. A second reagent may include Au nanocubes. A third reagent may include L-aa. A flowrate of a reagent through the tubing may be 1.8 mL per hour.

In some embodiments, the tubing may include polytetrafluoroethylene. The capillaries may include silica capillaries. The tubing may have an inner diameter of approximately 1.58 millimeters. The capillaries may have an inner diameter of approximately 0.250 millimeters. The heating element may have a temperature of approximately 55° C.

According to another aspect of the disclosure, a method for nanoparticle synthesis may include placing a plurality of syringes on a syringe pump. The method may also include connecting tubing to each syringe. The method may also include connecting capillaries to the tubing so that ends of the capillaries meet at an injector site of a respective syringe. The method may also include positioning the tubing in a heating element to heat the tubing. The method may also include controlling a flowrate of a reagent through the tubing. The method may also include collecting droplets from the tubing in a centrifuge vial after exiting the tubing.

In some embodiments, placing a plurality of syringes on a syringe pump may include placing four syringes on the syringe pump. The method may include filling three of the four syringes with reagents. The method may include filling one of the syringes with silicone oil. Filling three of the four syringes with reagents may include filling a first syringe with a reagent that includes H2PdCl4. Filling three of the four syringes with reagents may include filling a second syringe with a reagent that includes Au nanocubes. Filling three of the four syringes with reagents may include filling a third syringe with a reagent that includes L-aa.

In some embodiments, connecting tubing to each syringe may include connecting polytetrafluoroethylene tubing to each syringe. Connecting capillaries to the tubing may include connecting silica capillaries to the tubing. Connecting tubing to each syringe may include connecting tubing having an inner diameter of approximately 1.58 millimeters. Connecting capillaries to the tubing may include connecting capillaries having an inner diameter of approximately 0.250 millimeters. The method may also include heating the heating element to a temperature of approximately 55° C.

BRIEF DESCRIPTION

The detailed description particularly refers to the following Figures, in which.

Figure 3:
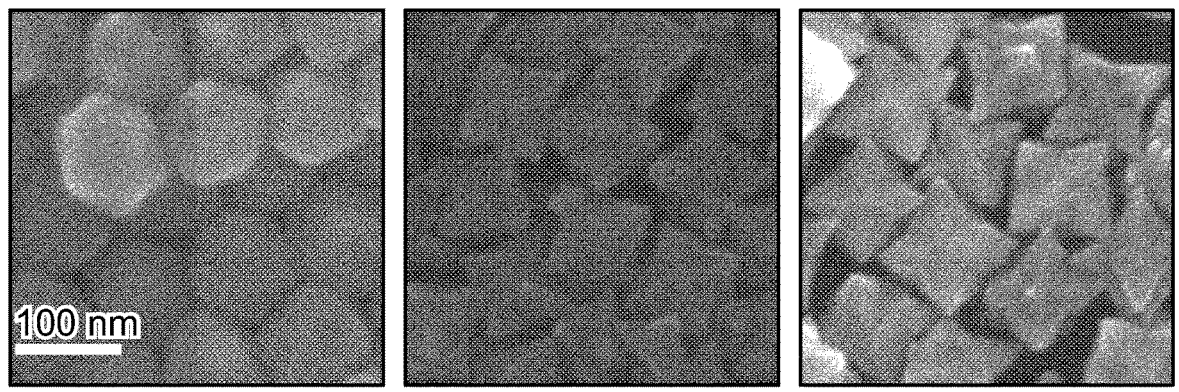

FIG. 3 is a concentration study of SMCR octopod syntheses via a microreactor keeping all syringe flowrates constant while changing both initial metal precursors concentrations in their syringes. Syringe pump 1 (Au precursor, CTAC, NaBr) and 2 (Pd precursor, CTAC, NaBr) pumped at 0.3 mL/hr, syringe pump 3 (HCl) pumped at 0 mL/hr, syringe pump 4 (Au octahedral seeds) pumped at 0.1 mL/hr, syringe pump 5 (L-aa) pumped at 0.6 mL/hr, and syringe pump 6 (silicone oil) pumped at 1.6 mL/hr. From left to right, the SEM images show the effects of changing the starting concentrations of HAuCl4 (0.96-1.92 mM) and H2PdCl4 (0.19-0.38 mM), while increasing the CTAC (38.46-76.92 mM) and NaBr (11.10-22.19 mM) concentration in Syringe pump 1 and 2 for increased stabilization at higher metal precursor concentrations. Longer and sharper tips were observed as the starting concentrations of both metal precursors were increased.

Figure 4:
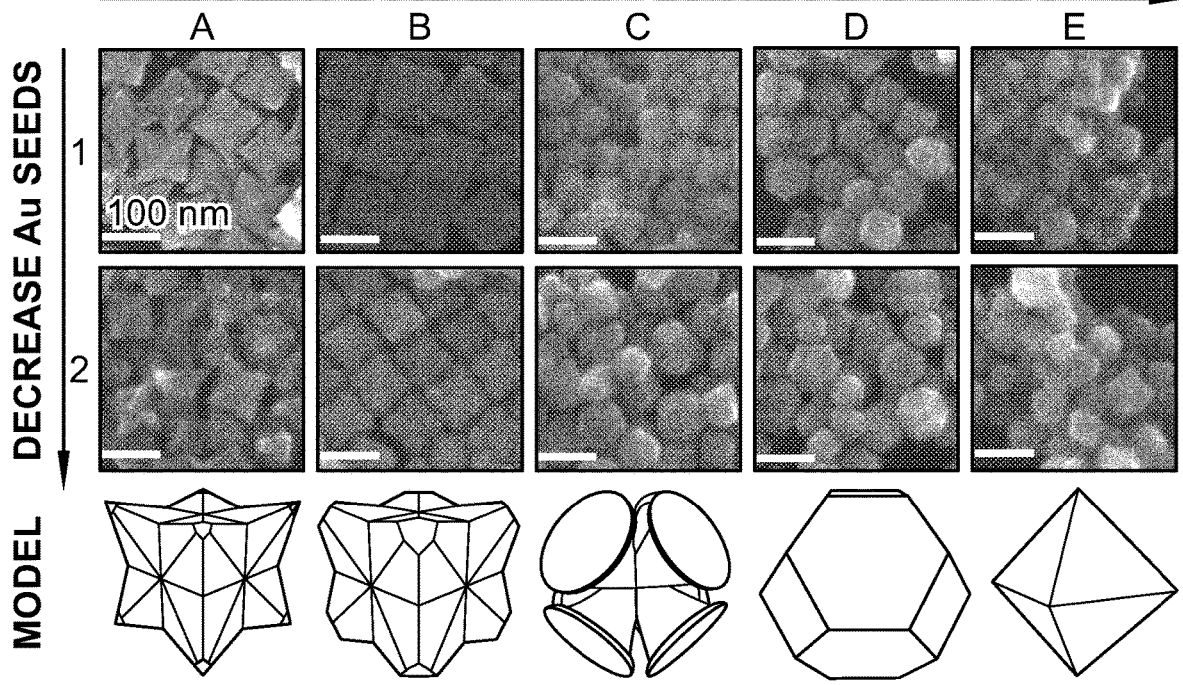

FIG. 4 is a flowrate study of SMCR syntheses in a microreactor. Kinetic products were synthesized by varying the relative flowrates of syringe pumps 1-4 keeping the additive total flowrate at 0.7 mL/hr. Left to right shows SEM images of the products synthesized by increasing the 250 mM HCl flowrate with respect to the Au and Pd precursors. (row 1) The flowrate of the Au seed solution was constant at 0.1 mL/hr. (row 2) SEM images of the products synthesized by decreasing flowrate of the Au octahedral seed solution to 0.05 mL/hr. Models represent the particles shape and placement of atoms (Au=yellow, Pd=red).

Figure 5:
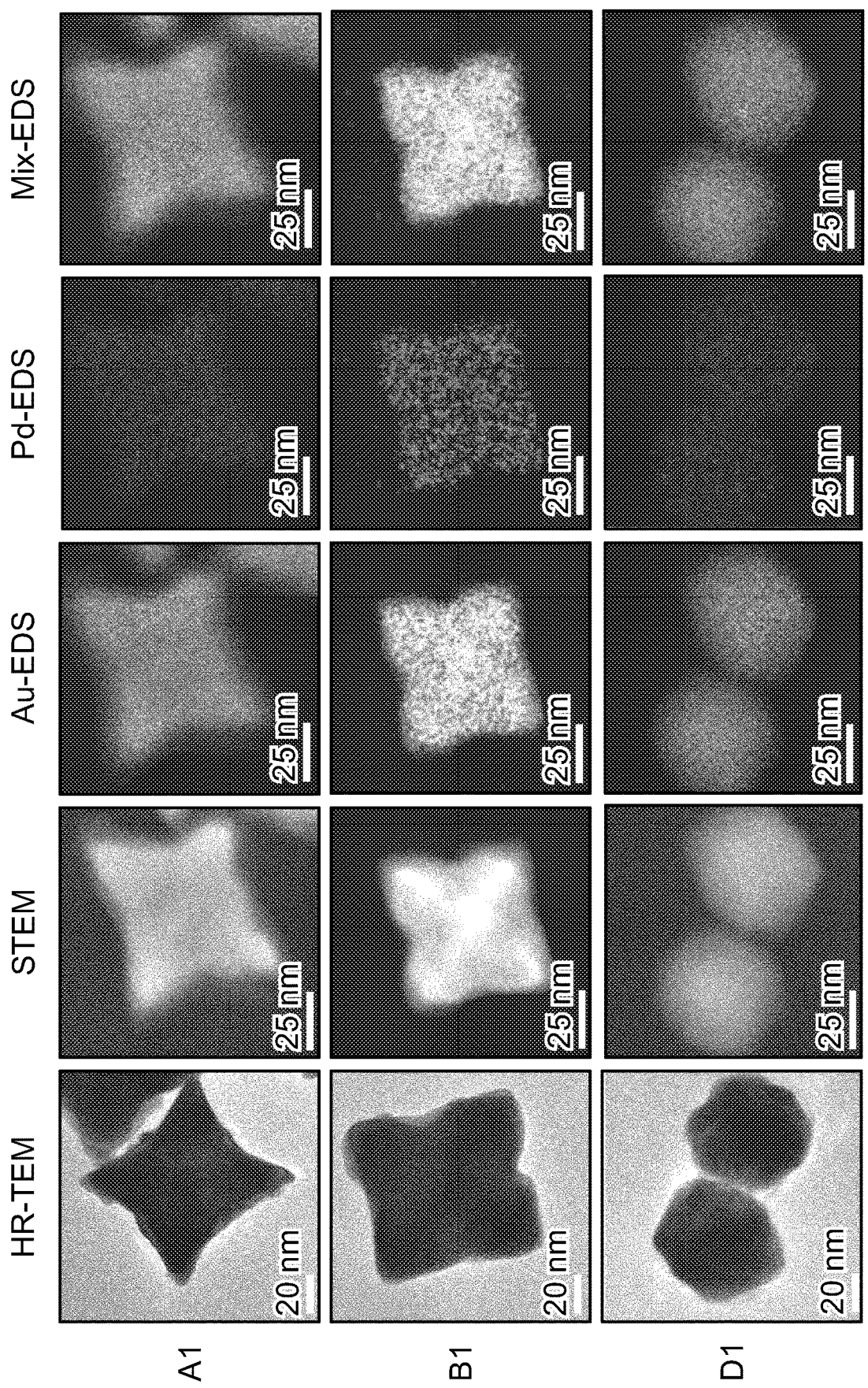

FIG. 5 is a detailed analysis of three Au—Pd products shown in FIG. 4 (A1=Sharp octopods, B2=Blunt Octopods, D1=Polyhedra). Elemental mapping shows the Au, Pd, and the overlay of both signals (Au=yellow, Pd=red).

FIG. 6 is a detailed flowrate and concentration chart of each droplet reaction shown in FIG. 5.

Figure 7:
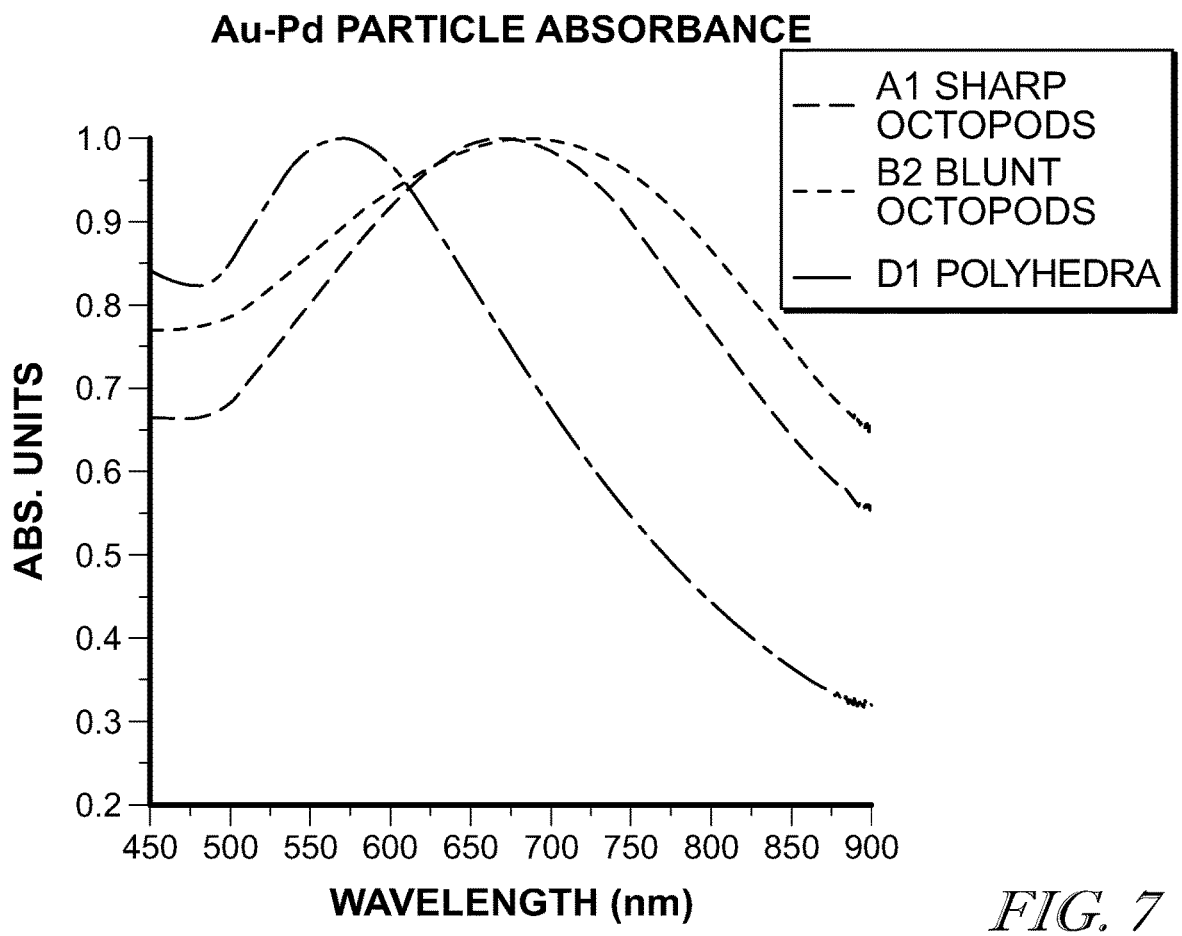

FIG. 7 illustrates UV-Vis absorbance measurements for particles shown in FIG. 4.

Figure 8:
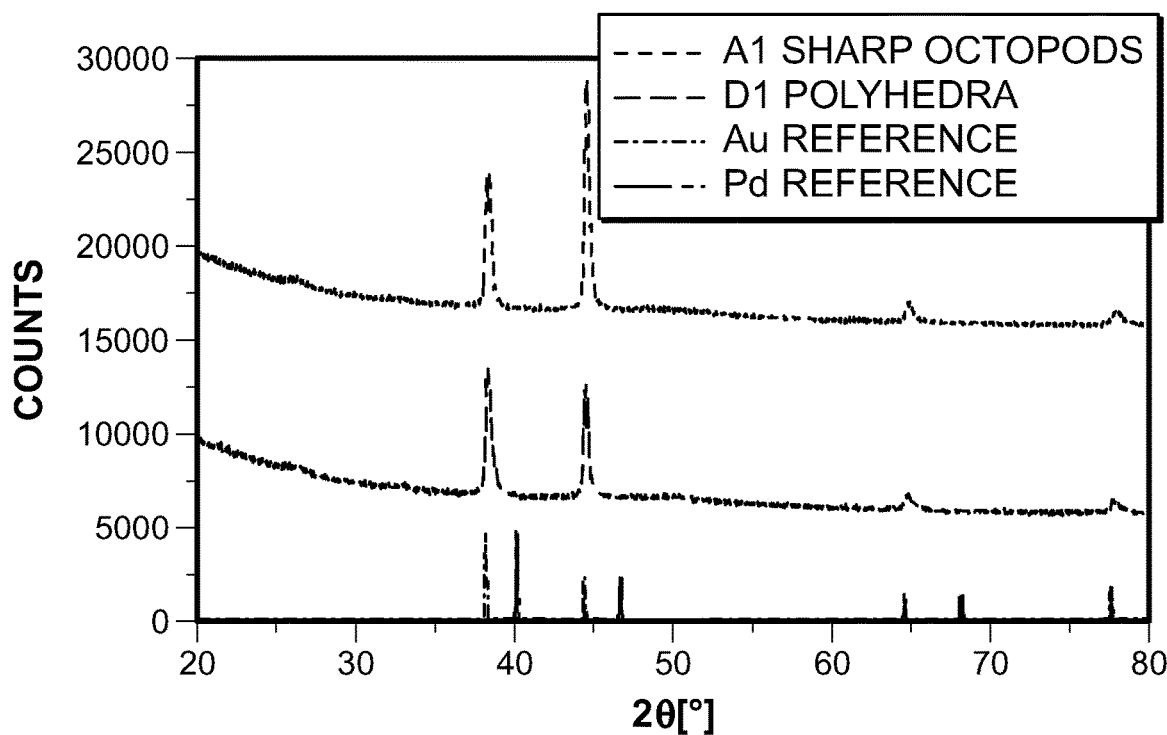

FIG. 8 illustrates powder X-ray diffraction patterns of the A1 sharp octopods and D1 polyhedra shown in FIG. 4. The orange lines correspond to reference Au-ICSD 44362 and the blue lines correspond to reference Pd-ICSD 52251. The slight asymmetry of the diffraction peaks to higher 2-theta is consistent with a Au-rich Pd phase. The small features below 30 degrees are from residual CTAB which is capping the particles.

FIG. 9 is an illustration of how pH tailors the rate of deposition with respect to rate of diffusion in SMCR, yielding Au—Pd NPs with different shapes (Au=yellow, Pd=red). The pH was adjusted inline through variation of the relative flowrates of reagent material.

FIG. 10 is a collection of SEM images of the product from batch reactions with equal equivalents of the A1 and D1 reactions after 1.5 hours residence time. Tip to tip lengths were measured for the microreactor and batch species and recorded above.

Figure 11:
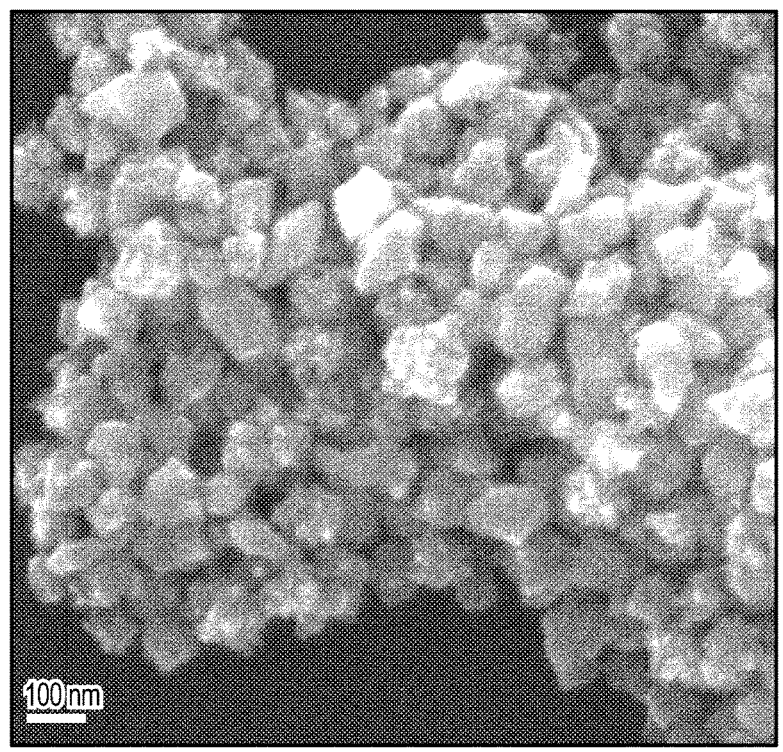

FIG. 11 is an SEM image of the product obtained from the synthesis that yields the A1 product shown in FIG. 4; however, here, no octahedral Au seeds were used in the synthesis.

Figure 12:
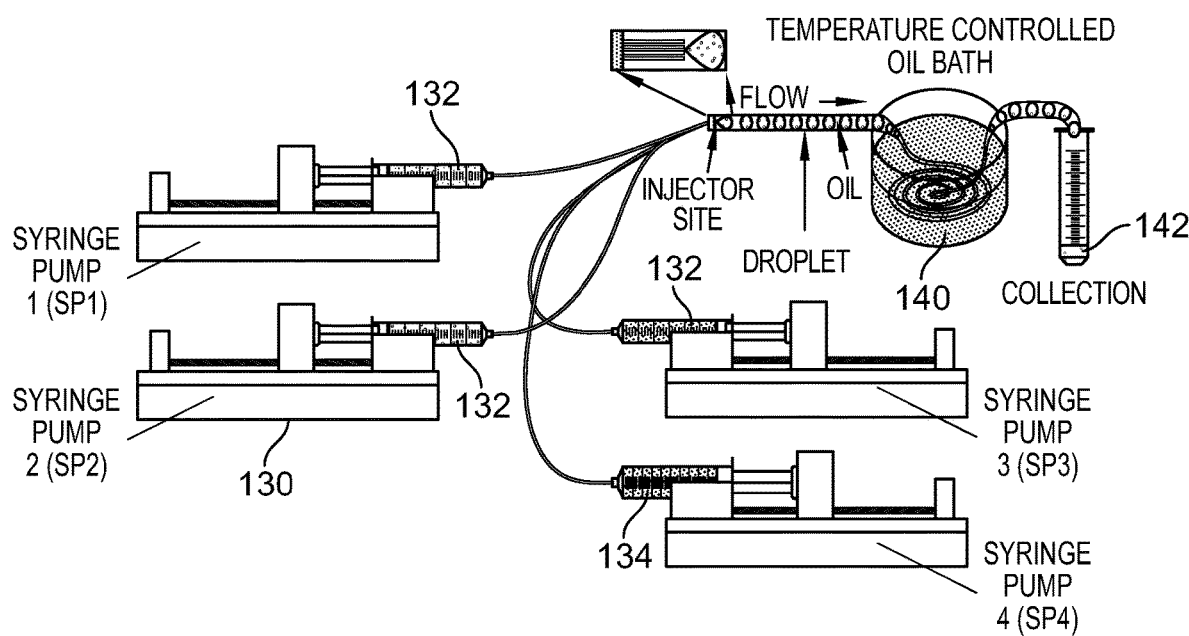
Figure 15A:
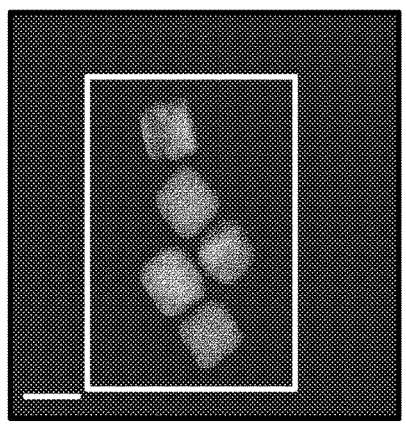
Figure 15B:
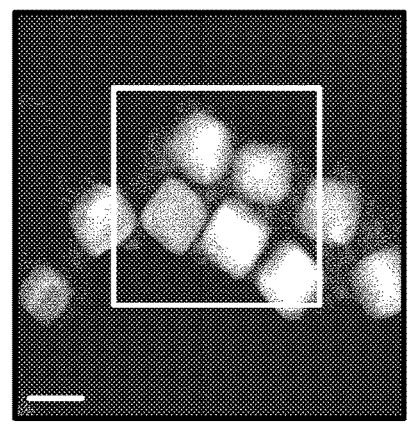
Figure 15C:
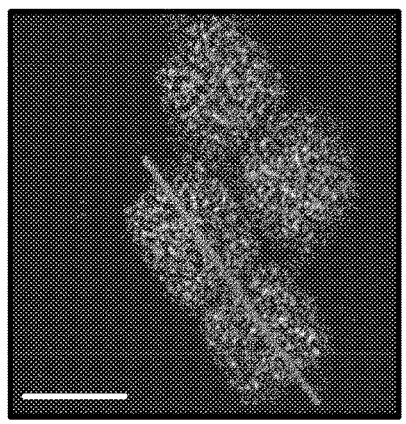
Figure 15D:
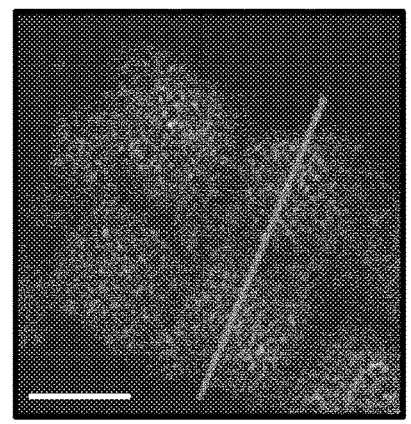
Figure 15E:
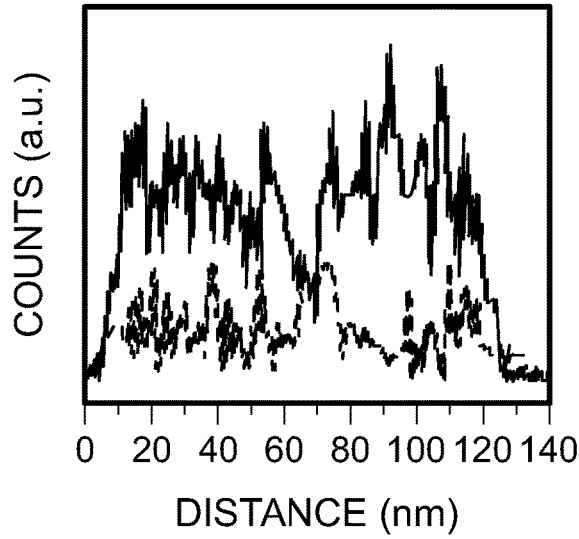
Figure 15F:
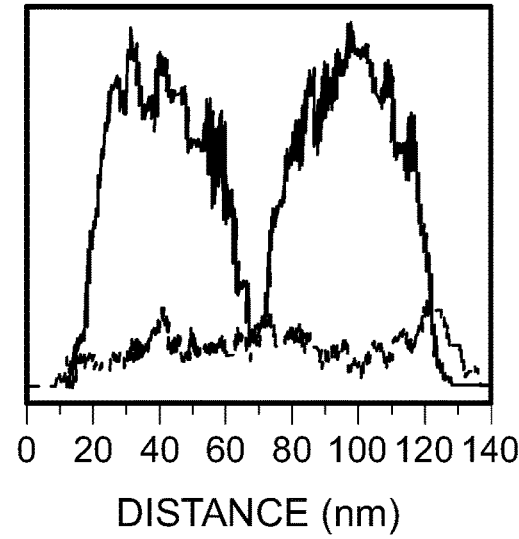

FIG. 12 is an illustration of the microreactor used for continuous production of core@shell nanoparticles. The magnified region of the injector site shows that the ends of the capillaries were placed evenly for droplet generation. The microreactor was constructed from commercially available capillaries, syringe pumps, and tubing. The contents of Syringe 1 were CTAC, Pd precursor, and NaBr (omitted in the case of Au octahedral seeds). Syringe 2 contained the Au seeds. Syringe 3 contained the L-aa. Syringe 4 contained the silicone oil.

FIG. 13 is a table of concentrations of reagents in droplets during microreactor core@shell syntheses for Au nanocube seeds. Concentrations of seeds were determined through ICP-MS.

FIG. 14 is a table of concentrations of reagents in droplets during microreactor core@shell syntheses for Au octahedral seeds. Concentrations of seeds were determined through ICP-MS.

FIG. 15A-15F is a comparison of using (15A) H2PdCl4 (STEM image) and (15B) Na2PdCl4 (STEM image) during Au@Pd core-shell syntheses. The concentrations of both precursors were 0.25 mM. Elemental mapping of the products by STEM-EDS: (15C) the area within the white box in (15A) and (15D) the area within the white box in (15B). Line scans shown in (15E) and (15F) are of the particles marked with the green lines in (15C) and (15D). Scale bars in the STEM images and STEM-EDS maps are 50 nm.

Figure 16:
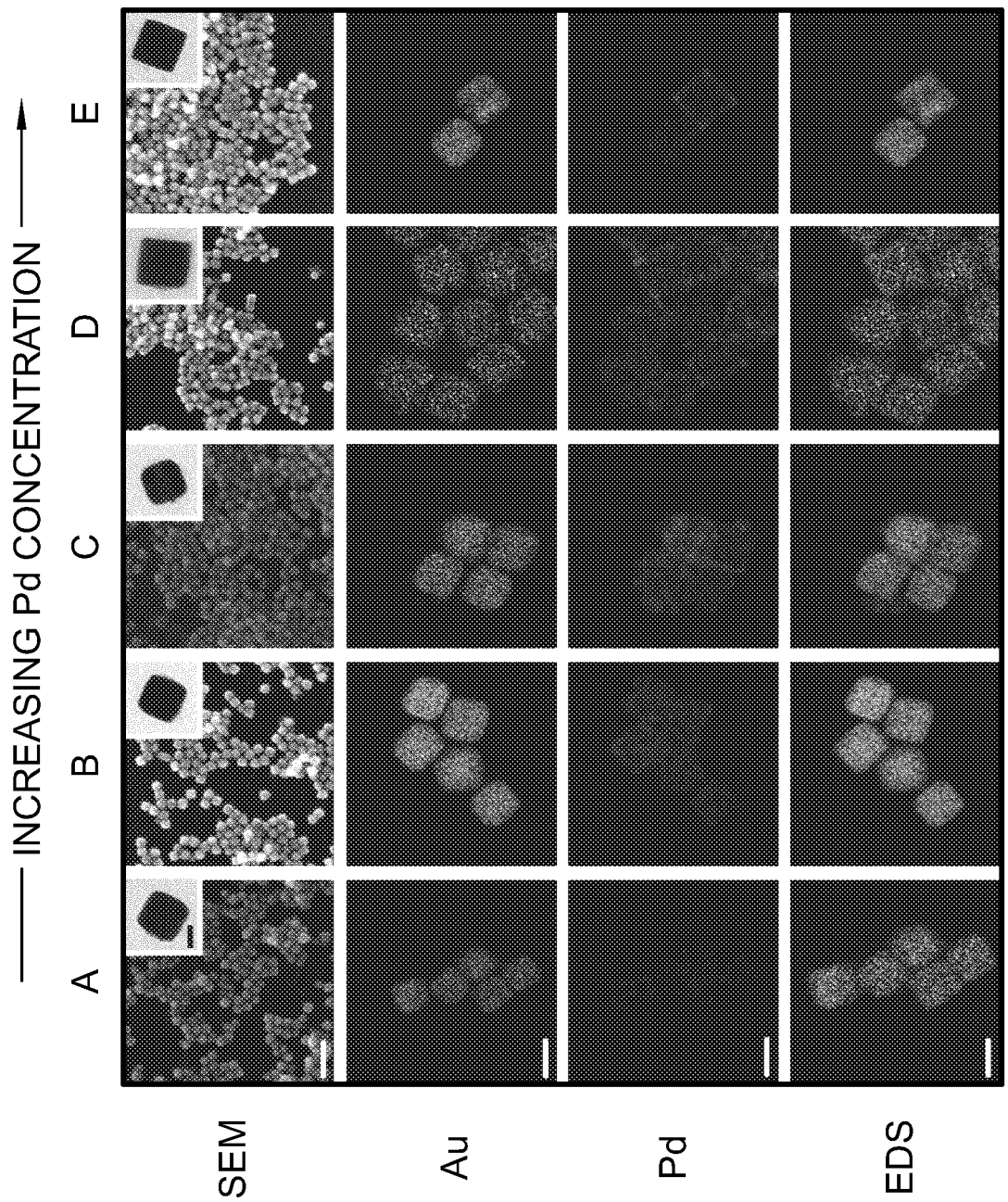

FIG. 16 is a characterization of Au@Pd nanocube samples from a concentration study (columns A-D), where the Pd precursor concentration increases in the feedstock syringe (A=0.25 mM, B=0.50 mM, C=0.75 mM, and D=1.00 mM H2PdCl4) with the flow rate ratio of Pd precursor to Au seeds, R1:R2, equal to 0.3 mL/hr: 0.3 mL/hr. (column E) Characterization of Au@Pd nanocubes synthesized in the same manner as D but with increased NaBr. (row SEM) Images of the Au@Pd particles (inset: TEM; scale bars: 25 nm) with scale bars 200 nm. (rows Au, Pd, and EDS) Elemental mapping of Au signal, Pd signal, and the overlay of the Au and Pd signals (Yellow=Au, Red=Pd). Scale bars are 50 nm.

Figure 17:
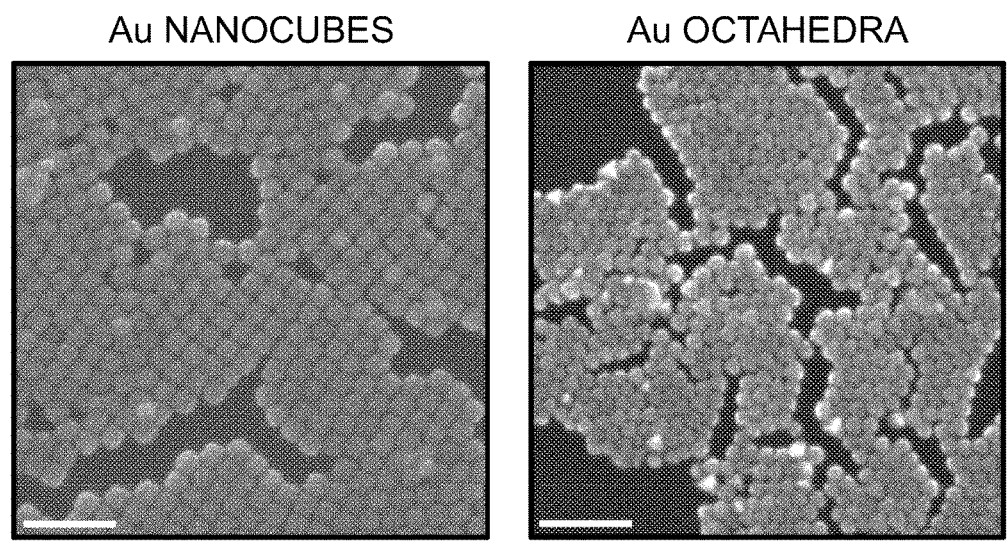

FIG. 17 is a collection of SEM images of Au nanocubes and Au octahedra used as seeds for the continuous flow droplet reactions; scale bars are 200 nm.

Figure 18:
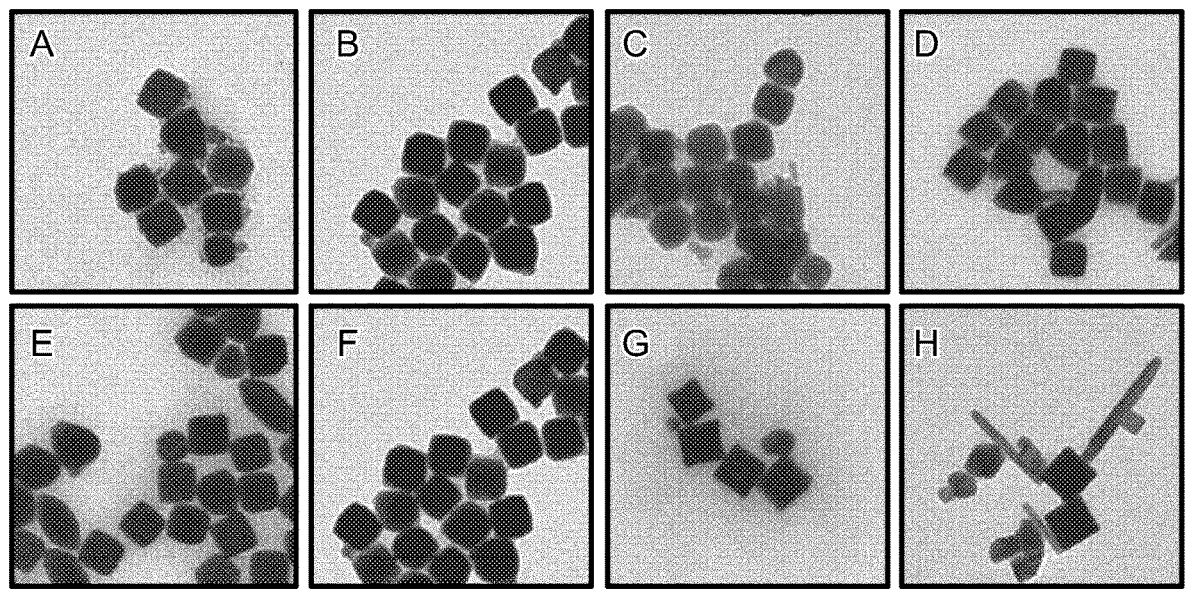

FIG. 18 is a multi-Particle TEM. A-D: Changing of the starting volume of Pd in syringe (A=0.25 mM, B=0.50 mM, C=0.75 mM, and D=1.00 mM). E-H: Changing of the flow-rate ratio (R1:R2) of Pd precursor:Au seeds (E=1:2, F=1:1, G=2:1, and D=5:1).

Figure 19:
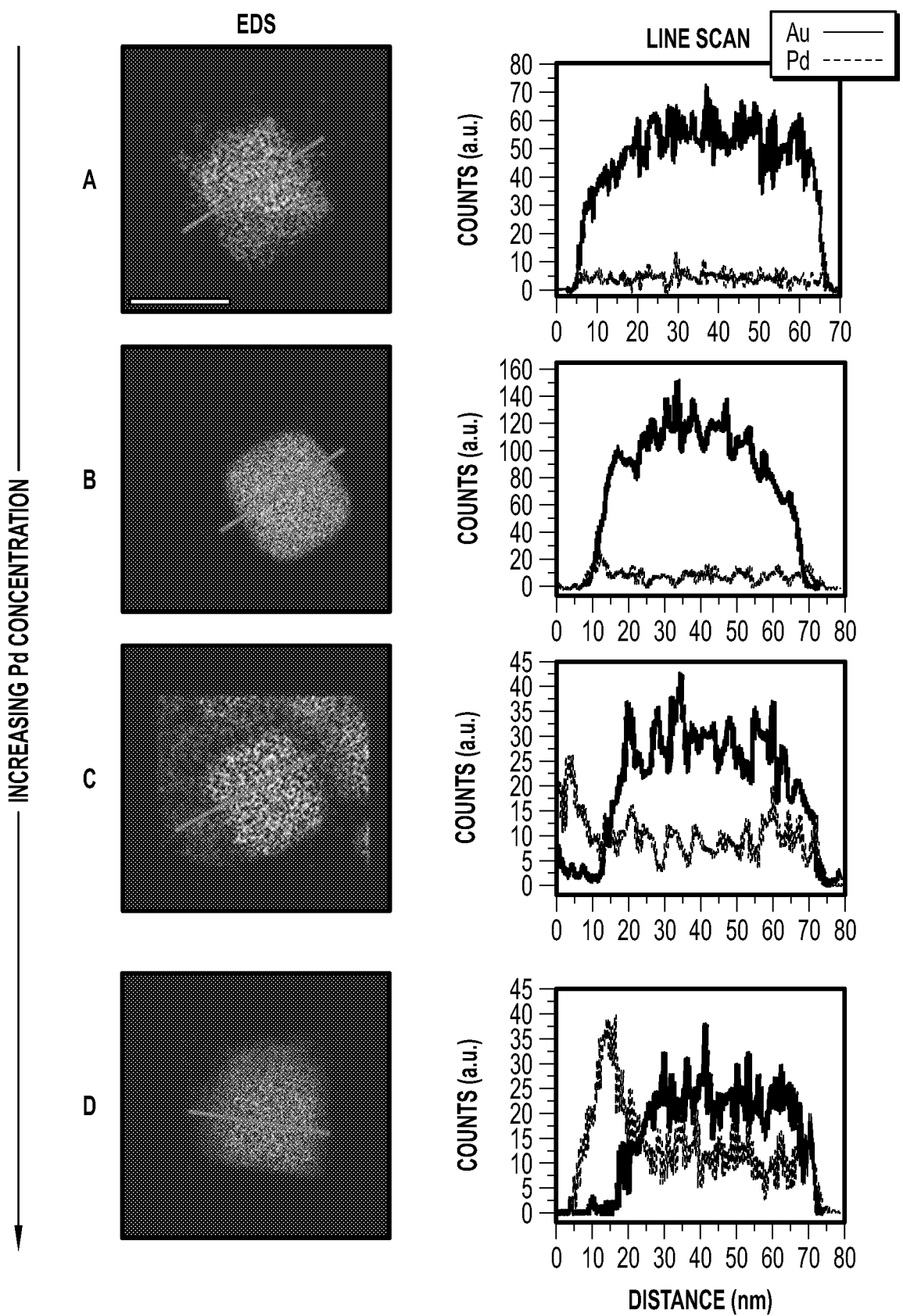

FIG. 19 is a characterization of Au@Pd nanocubes from concentration study (rows A-D) where the Pd precursor concentration is increased in the feedstock syringe (A=0.25 mM, B=0.50 mM, C=0.75 mM, and D=1.00 mM H2PdCl4) and the flow rate ratio, R1:R2, is equal to 0.3 mL/hr:0.3 mL/hr. (column EDS) Elemental mapping of the Au@Pd nanocubes (Yellow=Au, Red=Pd). (column Linescan) Line scan position across the particle is indicated by the green line. The scale bars are 50 nm.

Figure 20:
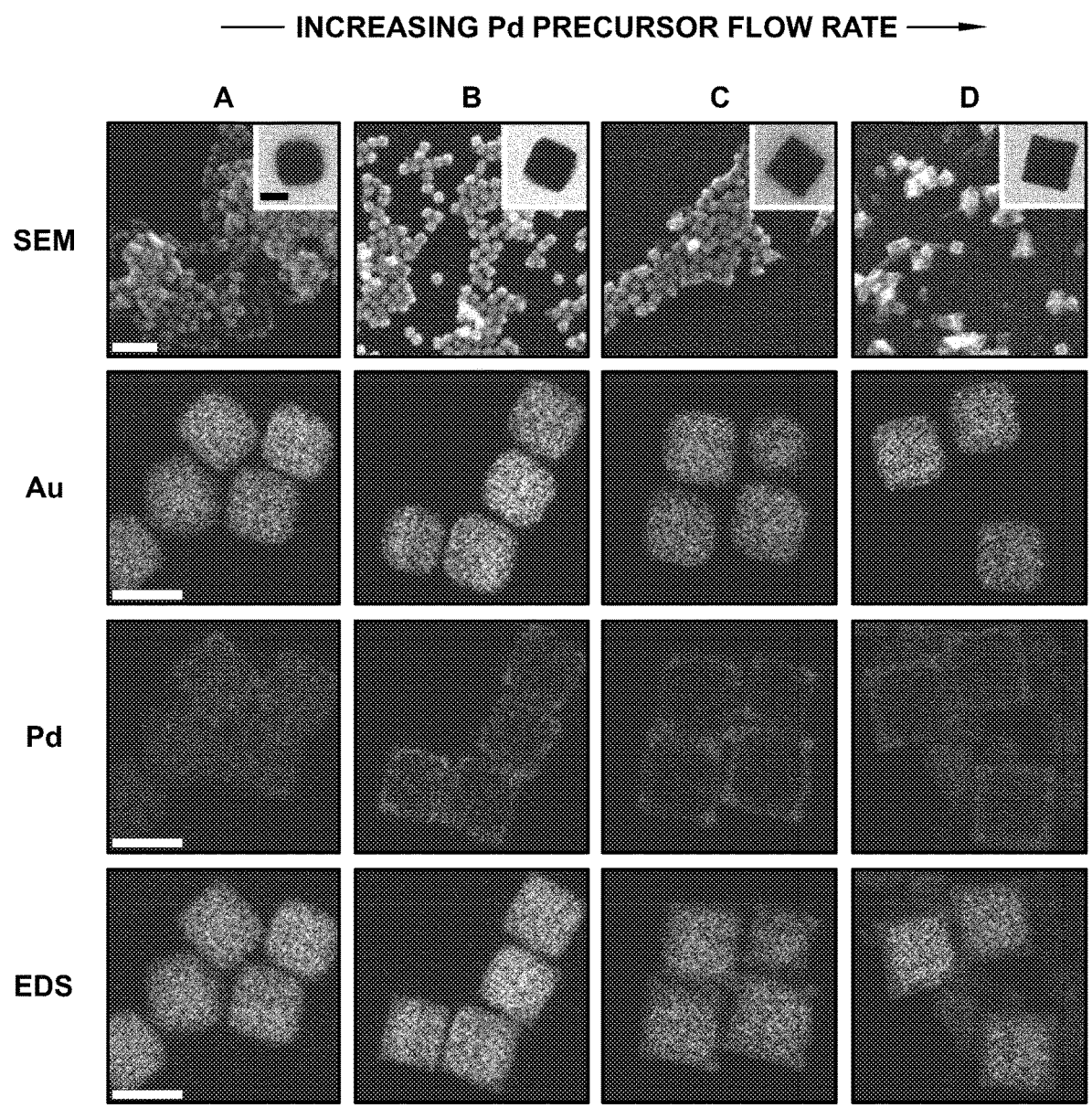

FIG. 20 is a characterization of Au@Pd nanocube product from flow-rate studies (columns A-D), where the relative flow-rates of R1:R2 increase as: A=1:2, B=1:1, C=2:1, and D=5:1, with the combined additive flow rate of the two syringe pumps equal to 0.6 mL/hr. (row SEM) Images of the Au@Pd particles (inset: TEM; scale bars: 25 nm) with scale bars 200 nm. (rows Au, Pd, and EDS) Elemental mapping of Au signal, Pd signal, and the overlay of the Au and Pd signals (Yellow=Au, Red=Pd). Scale bars are 50 nm.

Figure 21:
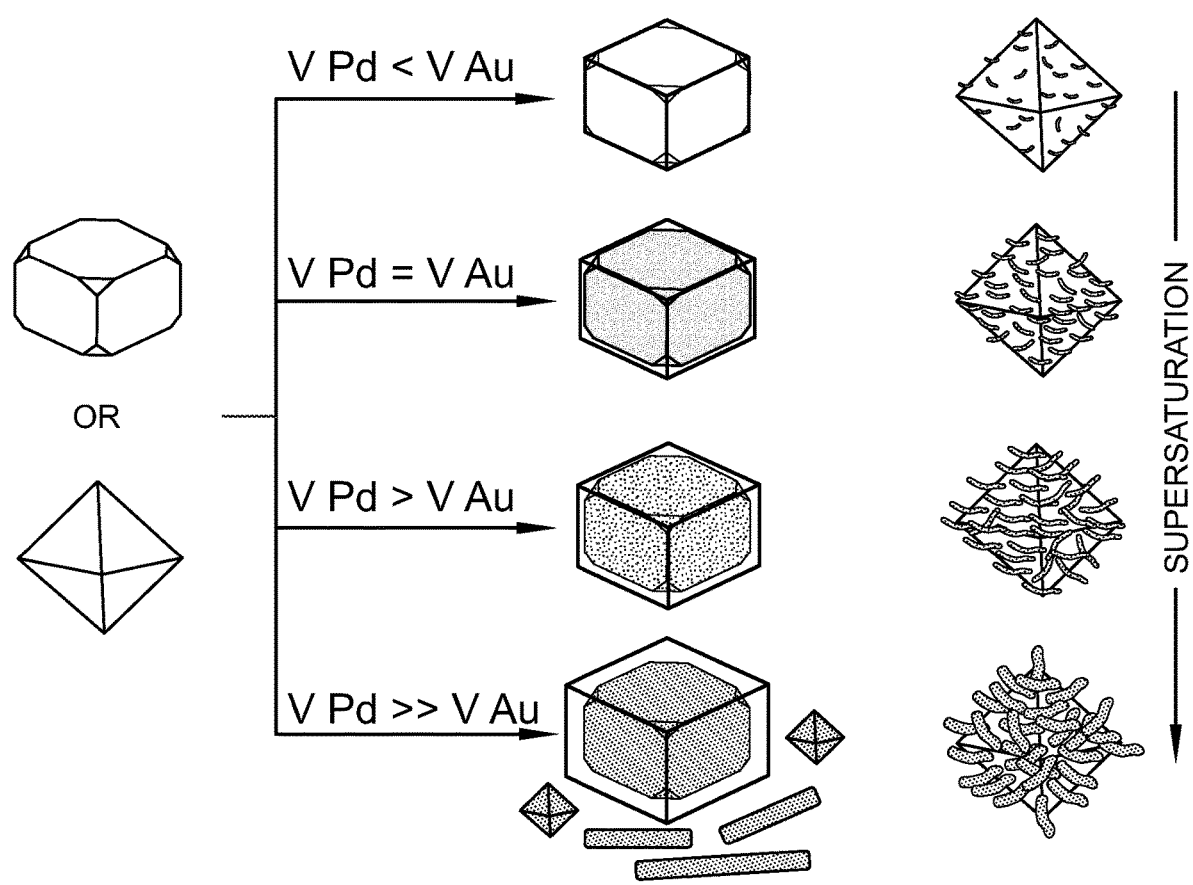

FIG. 21 is an illustration that shows the effects of changing relative flow-rate on supersaturation and the synthesis of Au@Pd nanocubes and octahedra.

Figure 22:
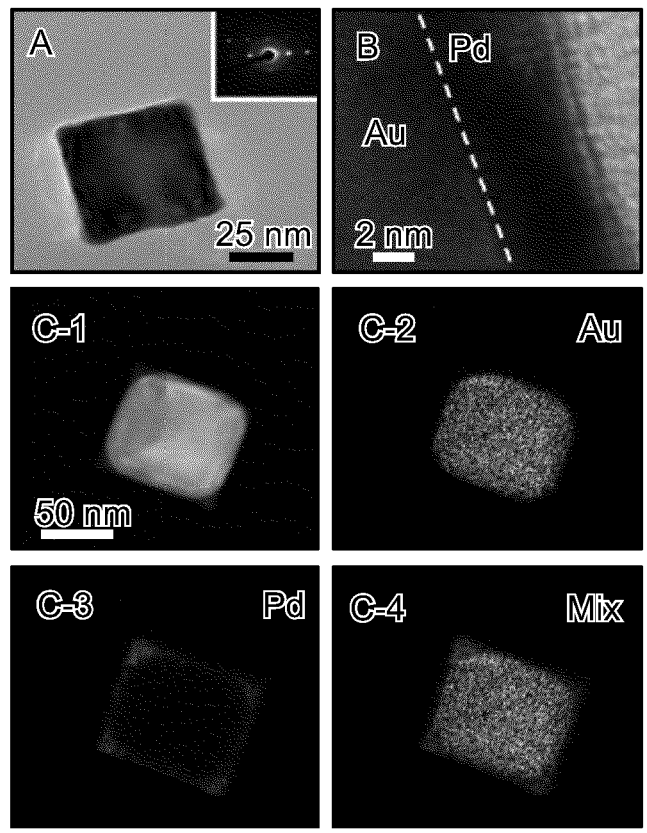

FIG. 22 is a detailed analysis of a single Au@Pd nanocube from column C in FIG. 20 (Flow rates of Pd:Au=2:1). (A) High-resolution transmission electron microscopy (HR-TEM) image of a Au@Pd nanocube. The inset to the image in (A) shows a selected area electron diffraction (SAED) pattern taken through the center of the cube. (B) Magnification of an edge of the nanocube in (A). (C) High-angle annular dark field scanning transmission electron microscopy (HAADF-STEM) image (C-1) and Au cube (C-2), Pd shell (C-3) and overlay of the Au (yellow) and Pd (red) signals (C-4).

Figure 23:
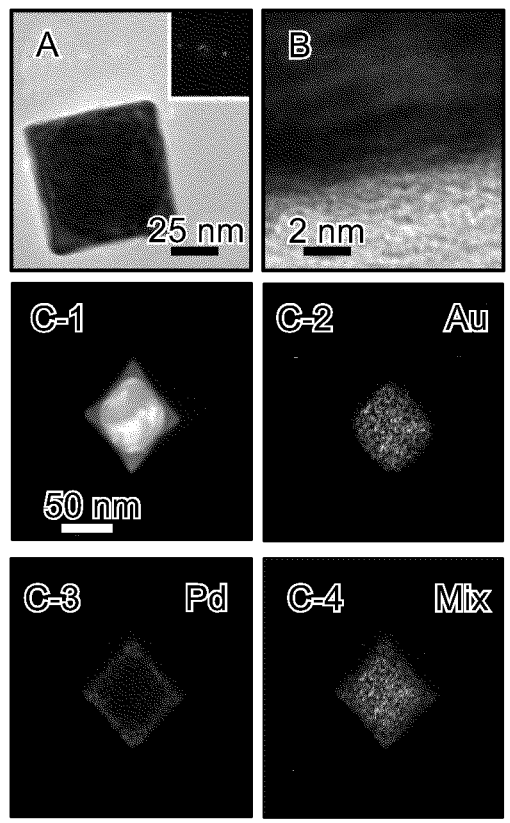

FIG. 23 is a detailed analysis of a single Au@Pd nanocube from Column D in FIG. 20 (Flow rates of Pd:Au=5:1). (A) High-resolution transmission electron microscopy (HR-TEM) image of a Au@Pd nanocube. The inset to the image in A shows a selected area electron diffraction (SAED) pattern taken through the center of the cube. (B) Magnification of an edge of the nanocube in (A). (C) High-angle annular dark field scanning transmission electron microscopy (HAADF-STEM) image (C-1) and Au cube (C-2), Pd shell (C-3) and overlay of the Au and Pd signals (C-4).

Figure 24:
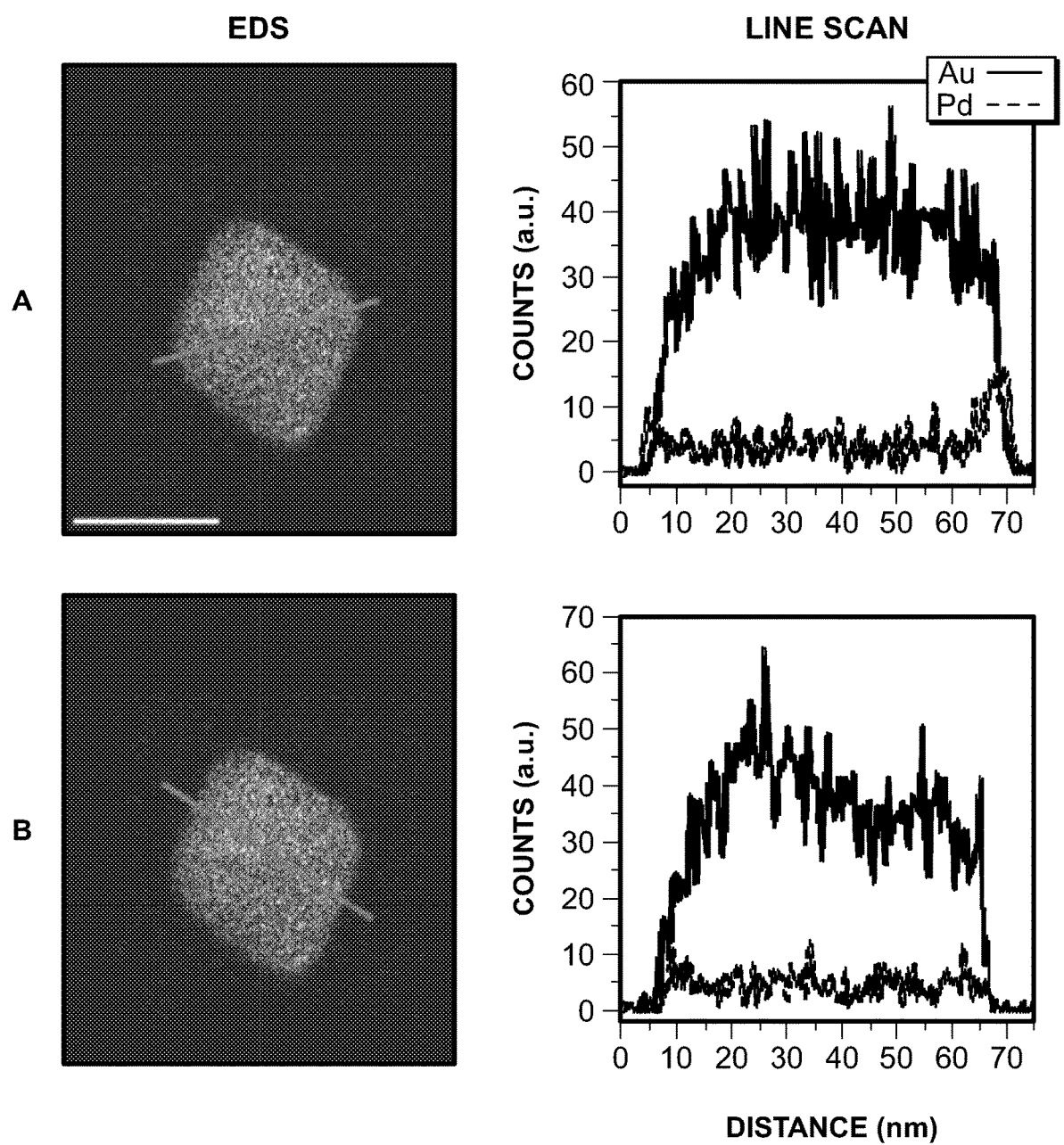

FIG. 24 is a line scan comparison of a single Au@Pd nanocube from Column A in FIG. 20 looking at differences between corner to corner and edge to edge profiles. The line scan positions are indicated by the green lines drawn across the particles. Scale bars for elemental mapping (Yellow=Au, Red=Pd) are 50 nm.

Figure 25:
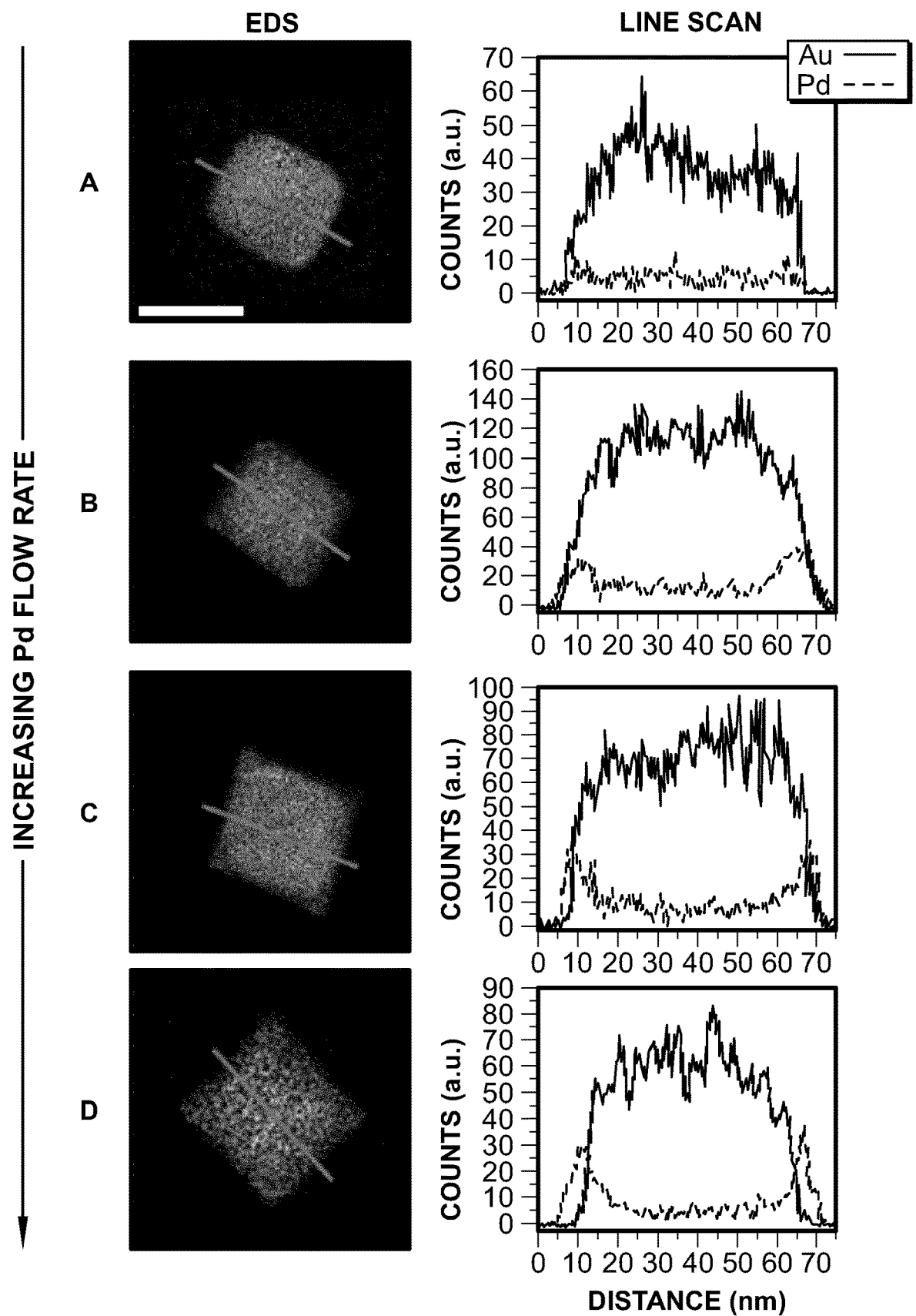

FIG. 25 is a characterization of the Au@Pd nanocrystals from a flowrate study (rows A-D) where the relative flow rates of Pd precursor to Au seeds, R1:R2 ratio, increases as: A=1:2, B=1:1, C=2:1, and D=5:1. (column EDS) Elemental mapping of the Au@Pd nanocubes (Yellow=Au, Red=Pd). (column Linescan) Line scan position across the particle is indicated by the green line. The scale bars are 50 nm.

Figure 26:
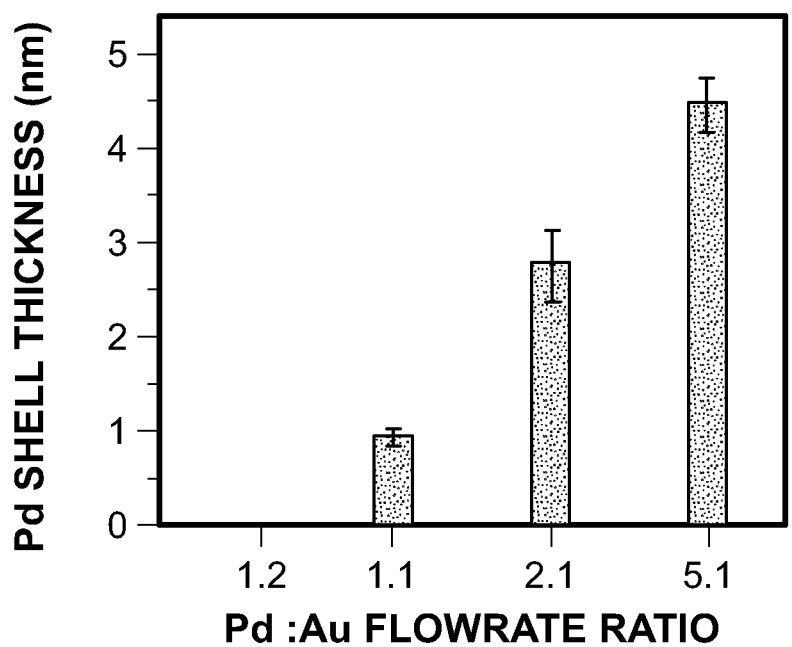

FIG. 26 is a bar graph that shows the dependence of Pd shell thickness for the Au nanocube flowrate study as a function of Pd:Au flow rate ratio. Note that that Pd shells are so thin for the samples prepared at a Pd:Au flow rate ratio of 1:2 that the Pd shell could not be discerned from the Au seeds to provide an accurate thickness value.

Figure 27:
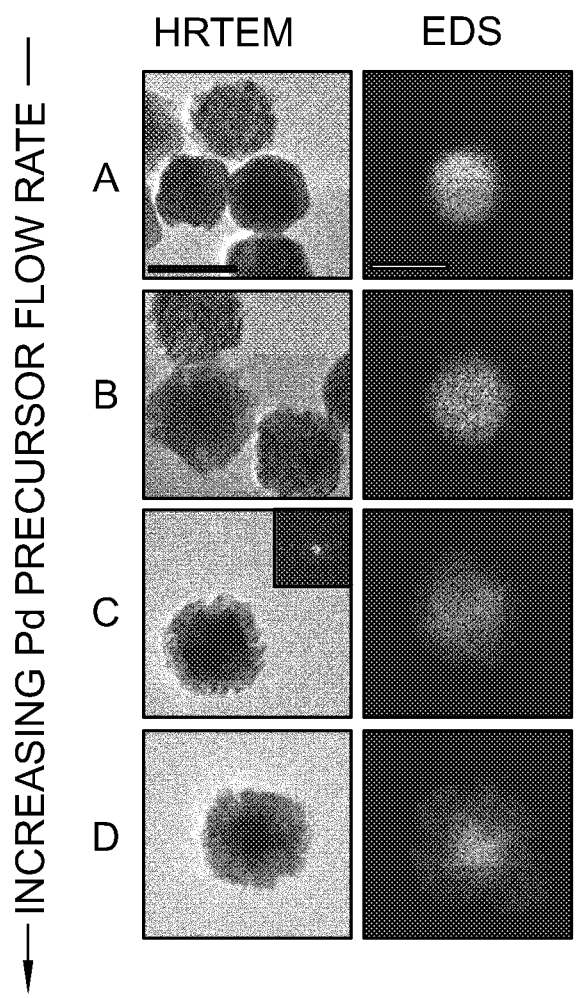

FIG. 27 is a characterization of Au@Pd octahedra from a flow-rate study (rows A-D), with increasing R1:R2 ratio (A=1:2, B=1:1, C=2:1, D=5:1) with the combined additive flow rate of the two syringe pumps equal to 0.6 mL/hr. (column HRTEM) Images of the Au@Pd particles with an SAED pattern inset for the 2:1 ratio sample. (column EDS) Elemental mapping showing an overlay of the Au and Pd signals. Scale bars for HRTEM images and STEM-EDS mapping (Yellow=Au, Red=Pd) are 50 nm.

Figure 28:
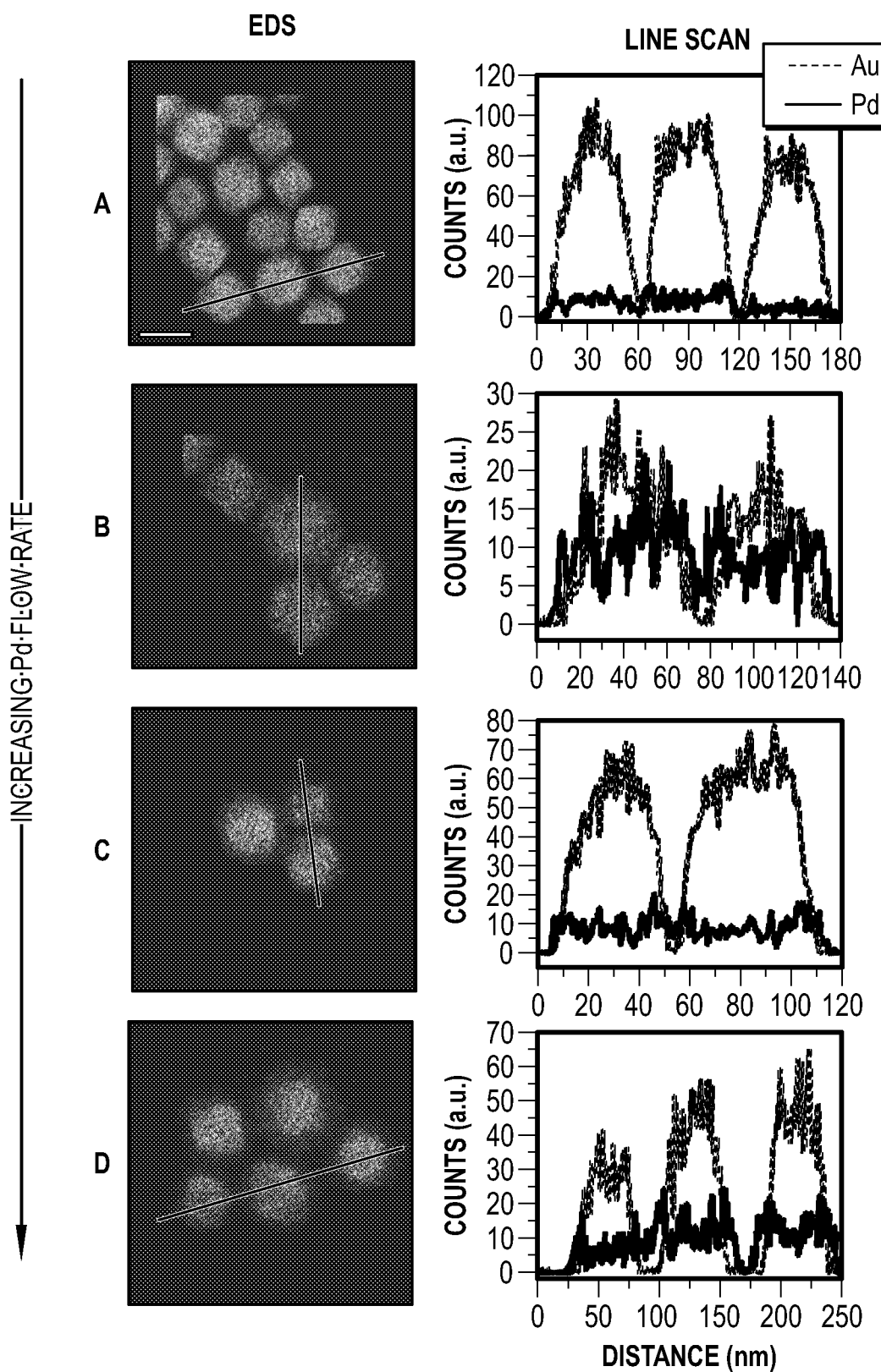

FIG. 28 is a characterization of Au@Pd octahedra from a flow-rate study (rows A-D) where the relative flow rates of Pd precursor to Au seeds, R1:R2 ratio, increases as: A=1:2, B=1:1, C=2:1, D=5:1. (column EDS) Elemental mapping of the Au@Pd octahedra (Yellow=Au, Red=Pd). (column Line Scan) Line scan position across the particles is indicated by the green line. The scale bars are 50 nm.

Figure 29:
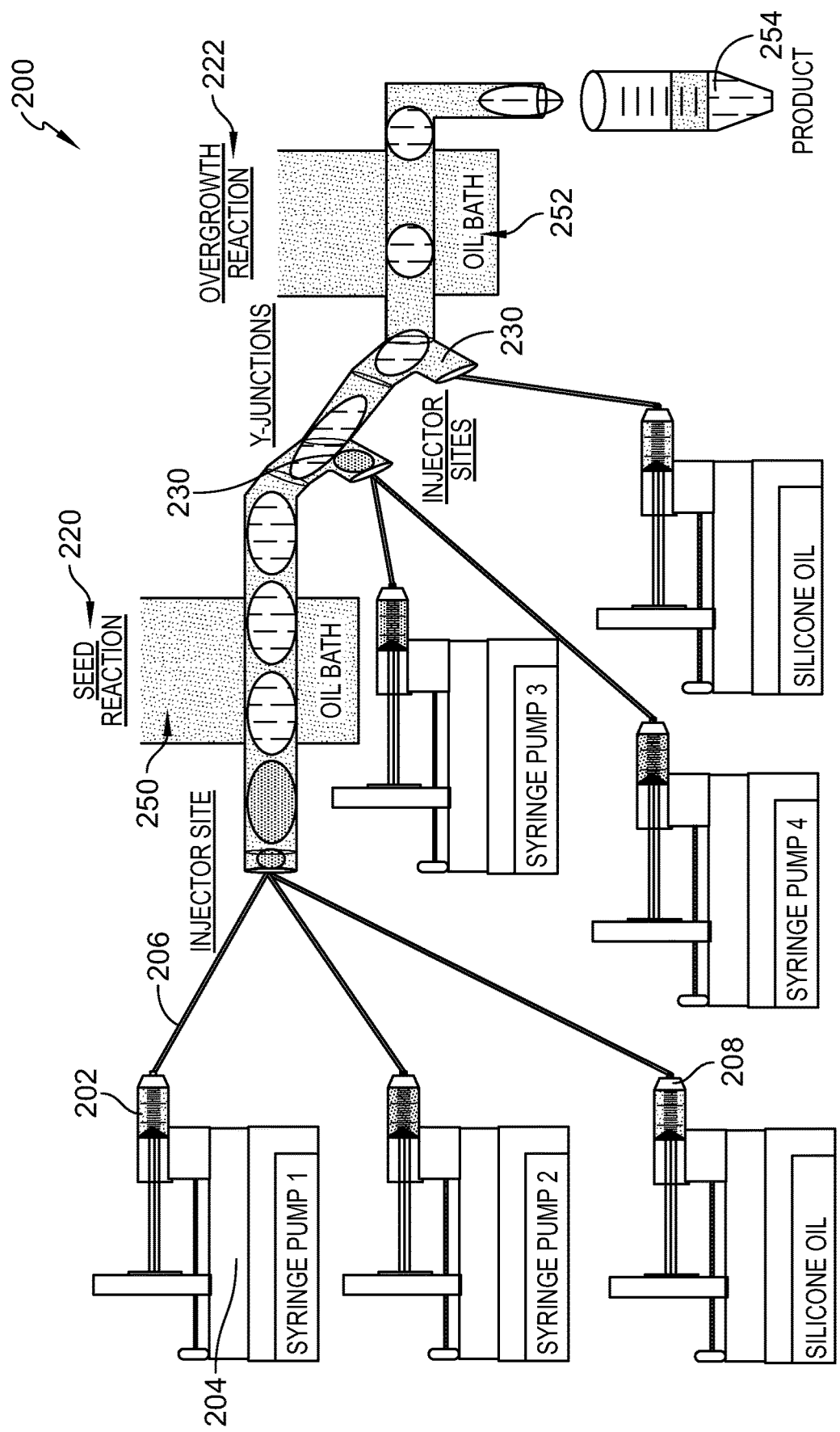

FIG. 29 is a schematic of a duo-microreactor used for continuous production of Pd-metal bimetallic NPs.

Figure 30:
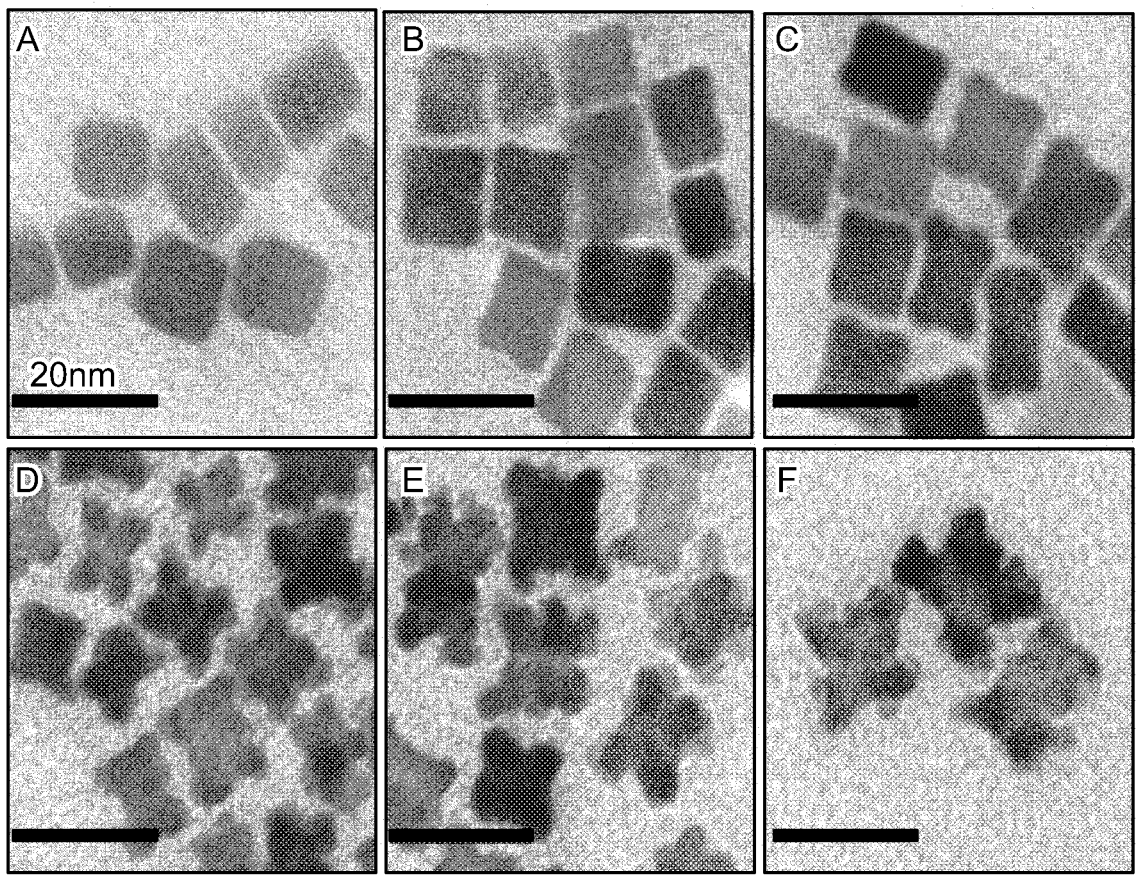

FIG. 30 illustrates TEM images of NPs synthesized in the duo-microreactor. A) Cubic Pd seeds synthesized in the first segment of the reactor. B-F) Branched Pd—Pt NPs synthesized with different amounts of Pt.

FIG. 31 is a table of concentrations of reagents in an overgrowth step during microreactor Pd-Metal multimetallic Np reactions in the second segment of the duo-microreactor.

Figure 32:
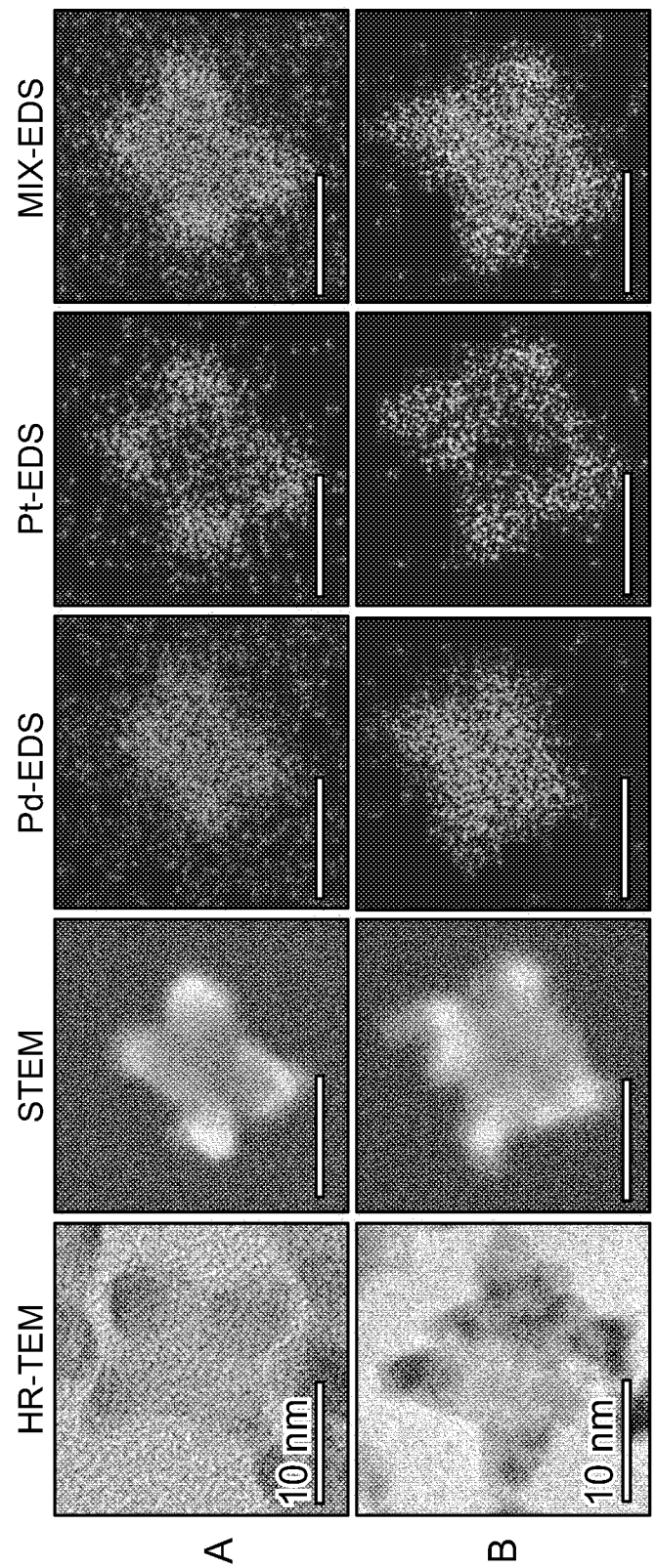

FIG. 32 illustrates HRTEM, STEM, and elemental mapping images of Pd—Pt metal NPs. Row A) Detailed analysis of an individual branched Pd—Pt NP from product shown in FIG. 30D. Row B) Detailed analysis of an individual branched Pd—Pt NP from product shown in FIG. 30F. Elemental mapping shows the Pd, Pt, and the overlay of both signals (Pd=red, Pt=blue).

Figure 33:
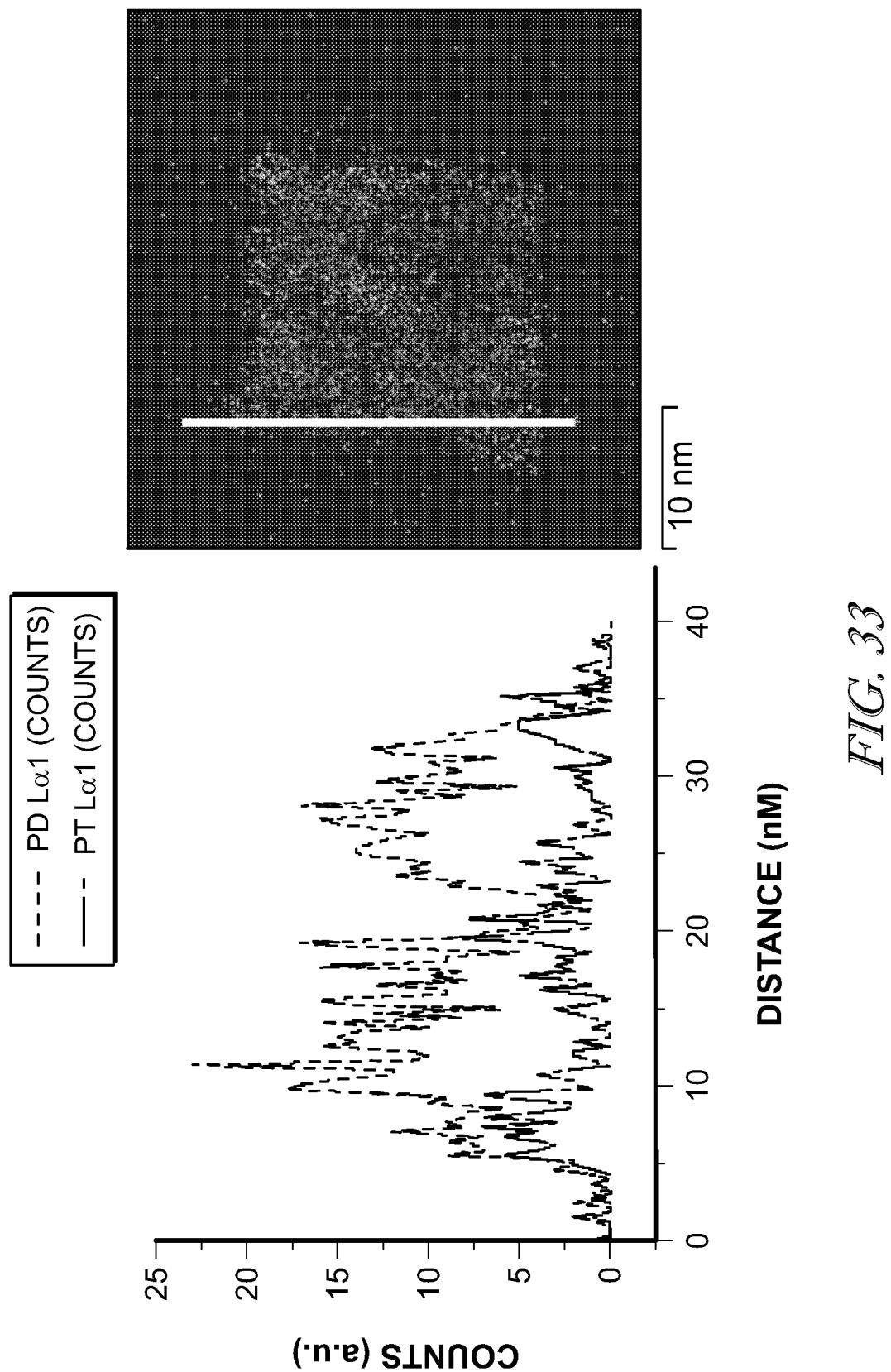

FIG. 33 is a line scan of multiple Pd—Pt nanostructures from Row A in FIG. 32 looking at differences between Pt corners and Pd cores. The line scan position is indicated by the white line drawn across the particles (Pd=red, Pt=blue).

Figure 34:
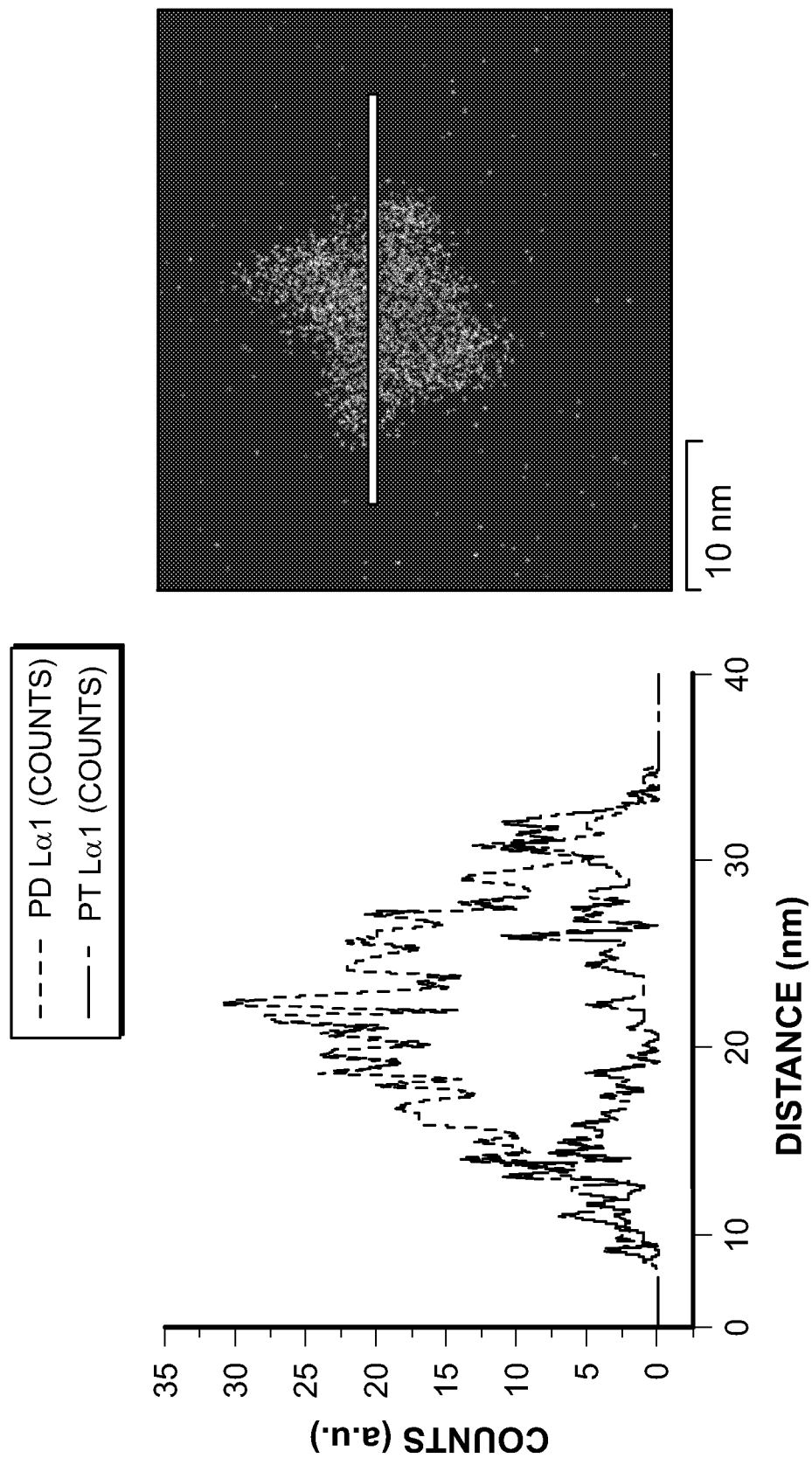

FIG. 34 is a line scan of a single Pd—Pt nanostructure from Row B in FIG. 32 looking at differences between Pt corners and a Pd core. The line scan position is indicated by the white line drawn across the particle (Pd=red, Pt=blue).

Figure 35:
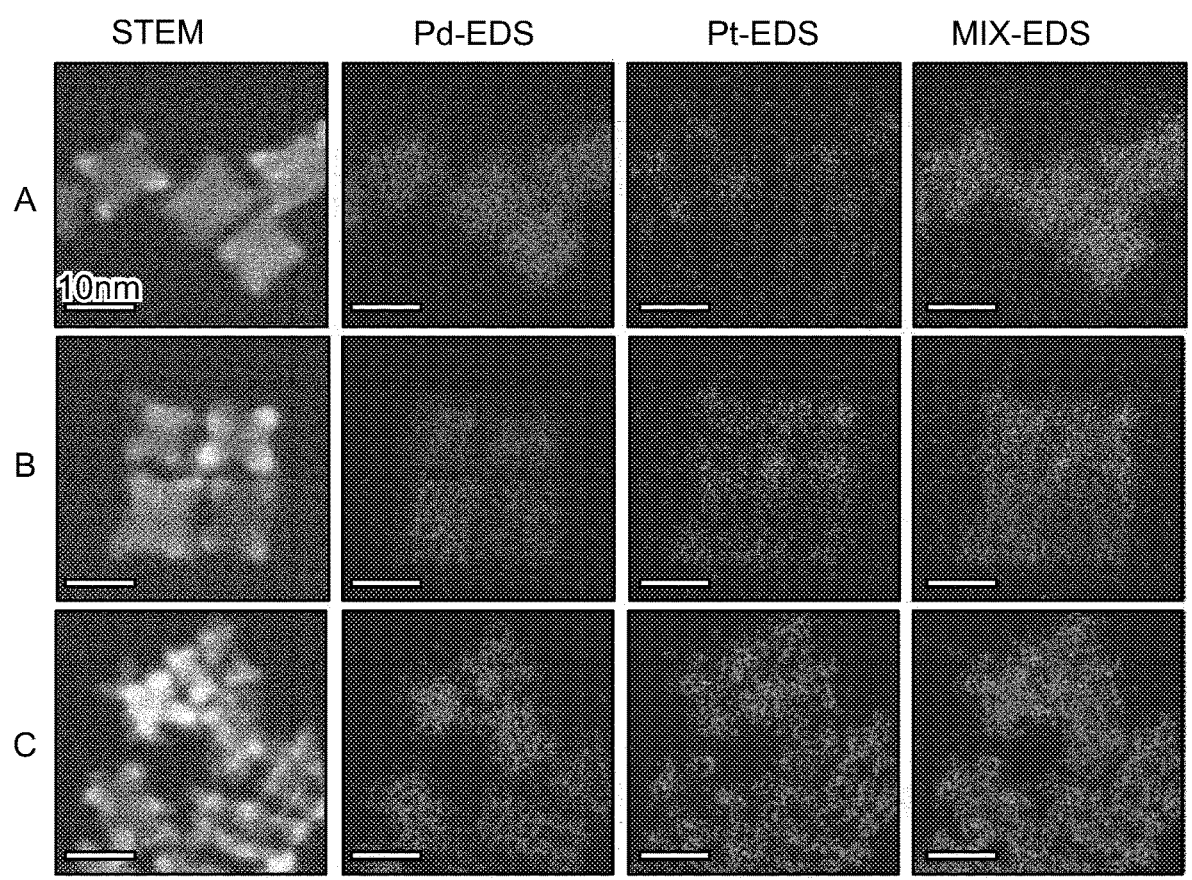

FIG. 35 illustrates multiparticle STEM and elemental mapping images of Pd—Pt NP products. Row A) Detailed analysis of products shown in FIG. 30C. Row B) Detailed analysis of products shown in FIG. 30D. Row C) Detailed analysis of products shown in FIG. 30F (Pd=red, Pt=blue).

Figure 36:
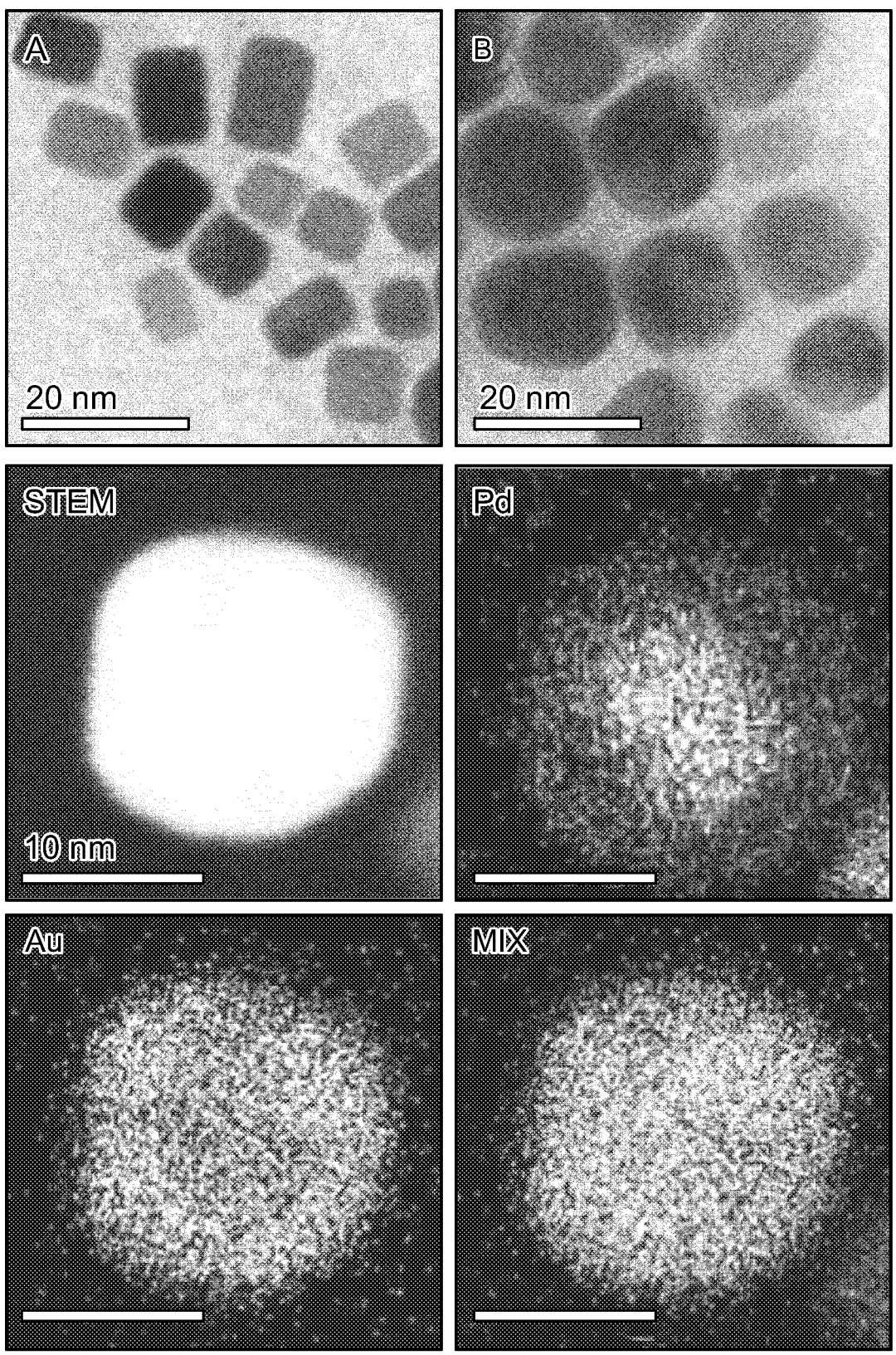

FIG. 36 illustrates various images. A) TEM image of cubic Pd seeds. B) TEM image of Pd@Au core@shell NPs synthesized in the duo-microreactor. Bottom) STEM and elemental mapping images of an individual Pd@Au core@shell NP. Elemental mapping shows the Pd, Au, and the overlay of both signals (Pd=red, Au=yellow).

Figure 37:
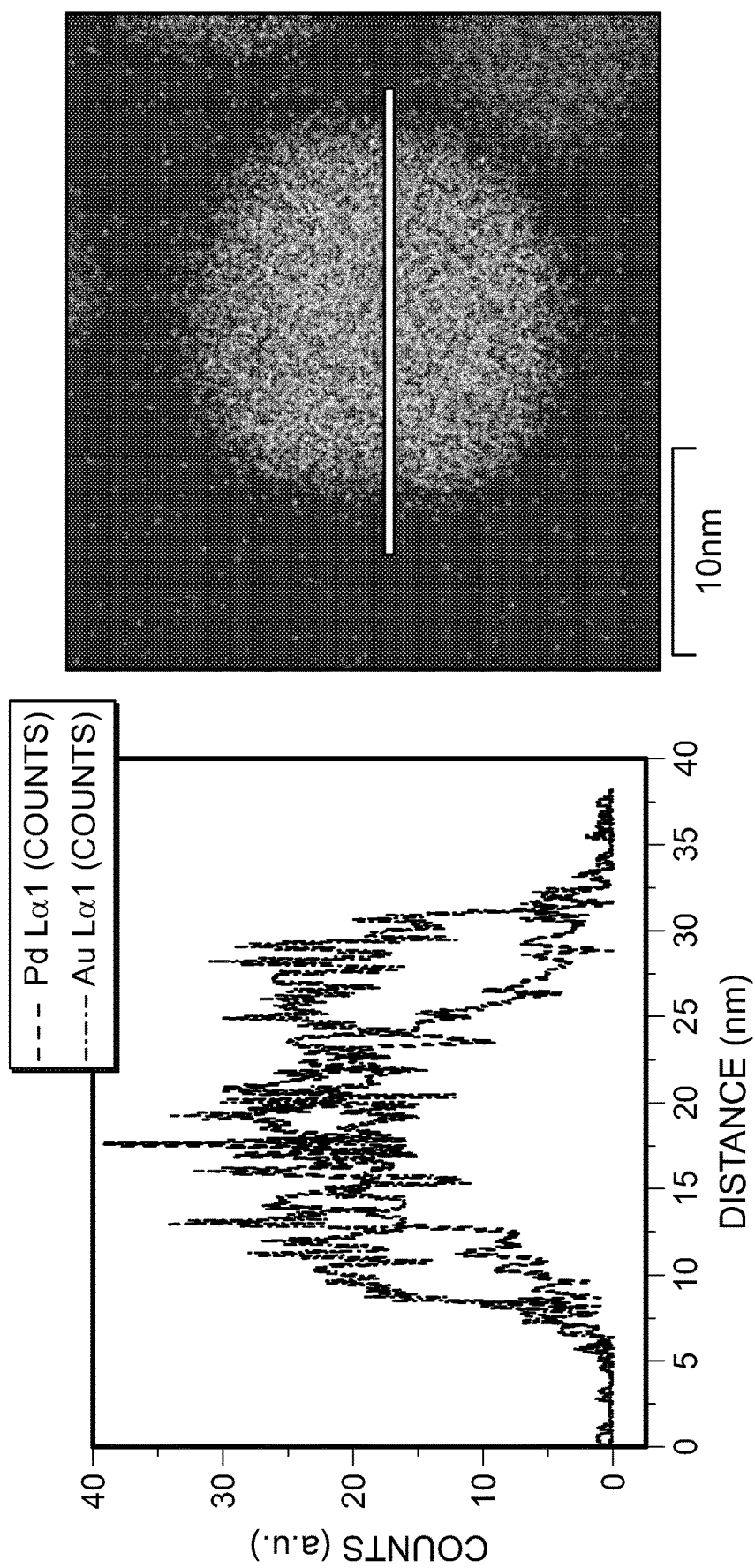

FIG. 37 is a line scan of a single Pd@Au core@shell nanostructure from FIG. 36 looking at differences between a Au shell and a Pd core. The line scan position is indicated by the white line drawn across the particle. (Red=Pd, Yellow=Au).

Figure 38:
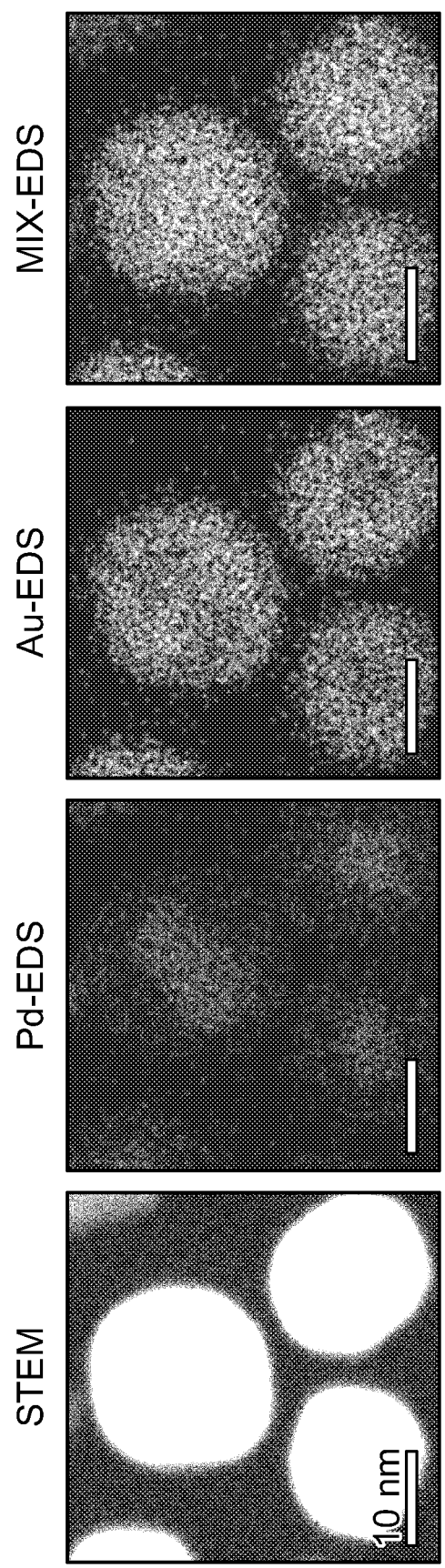

FIG. 38 is a multiparticle mapping of Pd@Au core@shell products shown in FIG. 36.

FIG. 39 is a table of concentrations of reagents in reaction droplets during microreactor Pd nanocube seed reactions in a first segment of the duo-microreactor.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
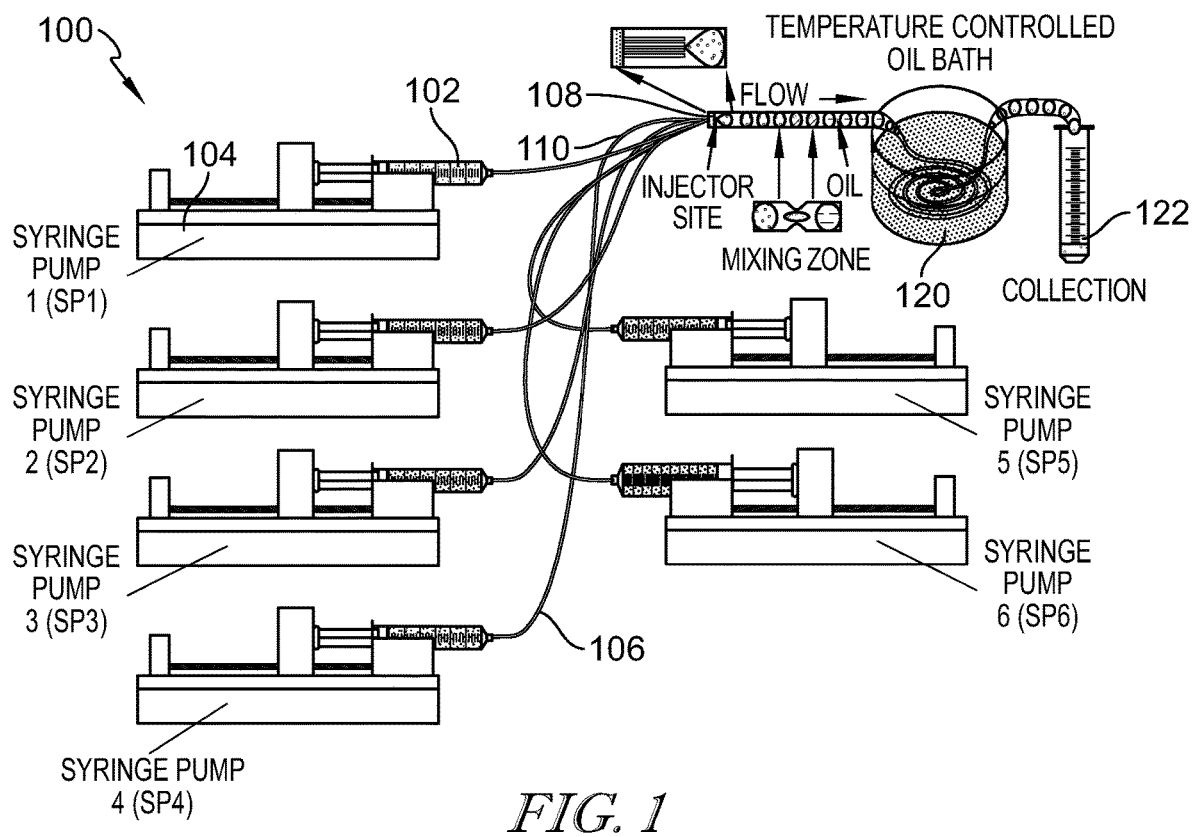
FIG. 1 is a schematic illustration of the microreactor used for continuous production of kinetically controlled NPs.

An illustration of the microreactor 100 is shown in FIG. 1. The microreactor 100 is designed to reduce Au and Pd precursors simultaneously with L-ascorbic acid (L-aa) in the presence of Au octahedral seeds and the capping agent hexadecyltrimethylammonium bromide (CTAB). Six syringes 102 placed on six syringe pumps 104 fed into PTFE tubing 106 at the injector site 108 through silica capillaries 110. The PTFE tubing 106 was fed through an oil bath 120 set at 25° C. so that room temperature fluctuations were accounted for during reactions. In other embodiments, the tubing 106 may be feed through any other suitable heating element, for example, a heating coil or heating jacket. A total additive flowrate of 1.3 mL/hr for the reagent material was maintained for a residence time of 1.5 hours. The flow rates of syringe pumps 1 (Au precursor, CTAC, NaBr), 2 (Pd precursor, CTAC, NaBr), and 3 (HCl solution) were held equal or varied depending on the experiment. Syringe Pump 4 contained Au octahedral seeds (characterized in FIG. 4) and was held constant at either 0.1 or 0.05 mL/hour. Syringe pump 5 contained L-aa and was held constant at 0.6 mL/hour. Syringe pump 6 contained the immiscible silicone oil and was held constant at 1.6 mL/hour. Preliminary metal precursor concentration studies were undertaken to determine the starting concentrations in syringes 1 and 2. SEM images of the products can be found in FIG. 5, with the highest metal precursor concentrations chosen for the flowrate manipulation study as this synthetic condition produced a high quality kinetic product, 8-branched Au—Pd nanocrystals with Oh symmetry. This product is anticipated based on previous reports of batch reaction SMCR producing octopodal AuPd nanostructures. 20

By increasing the flowrate of the HCl solution in syringe 3 and decreasing to the flowrate of Au and Pd precursors in syringes 1 and 2 while holding the flowrate of seeded solution constant in syringe pump 4 at 0.1 mL/hr, morphological shape changes of the nanoproducts were observed (FIG. 4, row 1). At relatively high pH, sharp octopods were produced. As the pH was lowered (increased HCl flow rate relative to metal precursors), blunt octopods, rounded octopods, polyhedra, and core@shell octahedra were synthesized, respectfully. As the HCl concentration increased with faster flowrates in the droplet reaction, the concentration of the metal precursors decreased with slower flowrates to maintain a total additive flowrate for syringes 1-4 of 0.7 mL/hr. By lowering metal precursor concentration in the reaction, smaller particles were synthesized. This size change is seen by comparing A1 and E1 products in FIG. 4. The decrease in the pH allowed the products to change from branched to non-branched species through modifying growth kinetics. By adding more H+ into the solution, L-aa stays in the protonated form. This modification changes the growth kinetics of the particle in solution, where the rate of adatom adsorption slows down with respect to adatom diffusion. By manipulating the adsorption rate with respect to the diffusion rate, the particle shape changes from kinetically favored sharp octopods to more stable core@shell octahedra, with different shapes in between.

To account for the decrease of the metal precursor flowrates generating smaller particles, the Au seed flowrate in syringe 4 was halved to 0.05 mL/hr (generating less seeds in solution) allowing the flowrates of the metal precursors to be increased, maintaining the total additive flowrate of 0.7 mL/hr for syringe pumps 1-4. Products from this study are shown in FIG. 4, row 2. The HCl flowrate for each individual reaction in row 2 corresponds to the HCl flowrate used in row 1 directly above. Changing the seed flowrate gives rise to new reagent ratios for row 2, while maintaining a similar pH as in row 1. Intuitively, less seeds and more metal precursors in a similar pH solution should generate larger sized particles. This seed adaptation allowed for larger sized particles to be synthesized. This is specifically shown in the E1 and E2 case, but at the cost of monodispersity. However, this change was expected because the supersaturation of the metal precursors was significantly higher with respect to seed concentration when the seed flowrate was decreased. Exact flowrate manipulations for rows 1 and 2 in FIG. 4 for syringes 1-4 are outlined in FIG. 6. The flowrate of syringe pump 1 equaled the flowrate of syringe pump 2 in each synthesis.

To better characterize the NPs synthesized, three samples were selected for higher analysis. Products corresponding to A1, B2, and D1 in FIG. 4 were selected. FIG. 5 shows HR-TEM, STEM, and elemental mappings of these samples. In each sample, Pd appears to be localized at the exterior, and for the branched species, it appears to predominantly be placed at the tips. These findings agree with the prior batch reactor reports. STEM-EDS finds the Au:Pd atomic ratio of the A1, B2, and D1 to be 9:1, 7:1, and 9:1, with the diagonal lengths approximately 134.7±10.6 nm, 103.5±6.3 nm, and 83.8±5.4 nm, respectfully. In the A1 STEM image, the Au seed is visible but not as apparent in the B2 and D1 particles. As the HCl concentration was increased, the HR-TEM, STEM, and elemental mapping images show the overgrowth became more conformal, generating lower energy particles.

This change in shape is due to adatoms having more time to diffuse and not become kinetically trapped. Absorbance measurements of A1, B2, and D1 can been seen in FIG. 7. The absorbance blue shifts as the particles become polyhedral. PXRD patterns confirm a structure consisting of Au as well as a Au-rich Au—Pd alloy, consistent with the Au seeds and deposited Au—Pd alloy (FIG. 8).

FIG. 9 summarizes the effects of HCl in the microreactor droplets as a function of flowrate. As pH decreases, the rate of adatom diffusion increases with respect to the rate of adatom adsorption. This study shows that inline shape modification of NPs is possible and the products of the microreactor syntheses are comparable to products from batch reaction (FIG. 10). In the absence of Au seeds, product uniformity cannot be achieved (FIG. 11). By bridging the versatility of microreactors with the known synthetic routes of batch reactions, continuous flow production on nanomaterials is achievable.

Bimetallic nanostructures are synthesized in small volume batches primarily. However, droplet-based reactors are receiving attention due to their ability to maintain thermal and compositional equilibrium within and between droplets, enabling flow operations for inline analyses and the scale-up of nanomaterial syntheses. Here, the syntheses of shape-controlled core@shell Au@Pd nanostructures with variable shell thicknesses are reported through control of the relative flow rates of reagents within the microreactor. Specifically, Pd shells were grown on cubic or octahedral Au seeds, selected as a model system. In batch reactions, shell thickness is determined by precursor concentration; however, as shown here, precursor feedstock concentration can be held constant, with the precursor concentration within the droplets being controlled through relative flow rates. This approach allows process conditions to be modified inline, rather than from batch to batch, to achieve particles with different shell thicknesses, and this procedure should be applicable to other multicomponent systems.

Experimental Section

Chemicals.

Gold (III) chloride trihydrate (HAuCl4.3H2O, ≥99.9% trace metal basis, Lot #MKCC8511), hexadecyltrimethylammonium bromide (CTAB, BioUltra, ≥99.0%, Lot #BCBS1424V), L-ascorbic acid (L-aa, C6H8O6, 99.0%, Lot #BCBS0460V), sodium citrate (HOC(COONa)(CH2COONa)2.2H2O, Batch #020M0026), cetyltrimethylammonium chloride solution (CTAC, 25 wt. % in H2O, Lot #STBG7166), palladium(II) chloride (PdCl2, 99.9%, Lot #MKBV5028V), and methanol (CH3OH, anhydrous, 99.8%) were purchased and used as received. Sodium bromide (NaBr, 99.99%, Lot #W08A041) was purchased and used as received. Chloroform (CHCl3, ACS) was purchased and used as received. Hydrochloric acid (HCl, 1.0 N, Lot #174569) and silicone oil (Lot #166612) were purchased and used as received. Milli-Q nanopure water (18.2 MΩ·cm) was used in all experiments.

Synthesis of Au Octahedra.

The synthesis of Au octahedra was adopted from a literature protocol.

Preparation of H2PdCl4.

The synthesis of H2PdCl4 was adopted from a literature protocol.

Design of Microreactor for Core@Shell Syntheses.

Six syringes were placed on six different syringe pumps (KD Scientific Inc.) and connected to polytetrafluoroethylene (PTFE) tubing (I.D.=1.58 mm) through silica capillaries (I.D.=0.250 mm) and held in place by epoxy. These capillaries were placed such that the end of the capillaries met at the same point in the injector site. After the injector site, the PTFE tubing was pinched three times separated by ~1 cm to help induce mixing within the droplet as the reaction had to squeeze through the pinching zone. 2 Around five feet of tubing was placed into an oil bath so that an overall reaction time of 1.5 hours could be met by the overall flowrate of the individual reaction droplets. After exiting the tubing, the droplets were then collected in a centrifuge vial 122 and washed with nanopure water.

Synthesis of Au@Pd Particles.

The syringe on syringe pump 1 contained a solution of 1.92 mM HAuCl4, 22.2 mM NaBr, and 76.9 mM cetyltrimethylammonium chloride (CTAC). The syringe on syringe pump 2 contained a solution of 0.38 mM H2PdCl4, 22.2 mM NaBr, and 76.9 mM CTAC. Syringes on syringe pumps 3, 4, and 5 contained solutions of 250 mM HCl, Au octahedral seeds, and 100 mM L-ascorbic acid (L-aa), respectively. Immiscible silicone oil was held in the syringe on syringe pump 6 and created the separation of aqueous reaction droplets. The flow rates of syringe pumps 1 (Au precursor, CTAC, NaBr), 2 (CTAC, Pd precursor, NaBr), and 3 (HCl solution) were held equal or varied depending on the experiment. Syringe Pump 4 was held constant at either 0.1 or 0.05 mL/hr and syringe pump 5 was held constant at 0.6 mL/hr. The total additive flowrate of the aqueous media was 1.3 mL/hr for each reaction. Kinetic and thermodynamic products were synthesized by varying the relative flowrates of Syringe pumps 1 (Au metal precursor, CTAC, and NaBr solution), 2 (Pd metal precursor, CTAC, and NaBr solution), 3 (250 mM HCl), and 4 (Au octahedra seed solution) while keeping the additive total flowrate of these four syringe pumps at 0.7 mL/hr. Syringe pump 6 was held constant at 1.6 mL/hr. Exact concentrations of reagent material within the droplets were calculated using the ratio: [Droplet]=[Reagent](Aq. Reagent Flowrate)/(Total Aq. Reagent Flowrate). Concentrations and flowrates of reagents in the reaction droplet are summarized in SI Table 1. By ensuring a 1.3:1.6 flowrate ratio of aqueous media to silicone oil, uniform droplets and similar residence times were observed for each reaction. Each synthesis was run at 25° C. with a residence time of 1.5 hours.

Characterization.

Samples for scanning electron microscopy (SEM) were prepared by drop-casting a 3 μL droplet of particle solution onto a cleaned Si wafer. After the solvent evaporated, the Si wafers were washed with methanol several times to remove excess surfactant. Images were obtained with a FEI Quanta FEG 600 field-emission environmental SEM.

For high-resolution transmission electron microscopy (HRTEM), selected area electron diffraction (SAED), and scanning transmission electron microscopy (STEM), a dispersed particle solution was drop-casted on a 300 mesh Cu grid (Ted-Pella, Formvar removed by dipping grid in chloroform). After 5 minutes, the grid was dipped in methanol, air dried for 30 minutes and then soaked in acetone overnight. Sample analysis by HRTEM and STEM were conducted on a JEOL JEM 3200FS TEM, equipped with a Gatan 4 k×4 k UltraScan 4000 CCD camera, operating at 300 kV with a spot size of 1. Energy dispersive X-ray spectroscopy (EDS) spectra were obtained with a liquid nitrogen cooled Oxford INCA dispersive X-ray system interfaced to the JEOL JEM 3200FS TEM. Elemental mapping was conducted in STEM-EDS mode. ICP-MS analysis of the Au seed solutions was carried out using a PerkinElmer SCIEX ELAN DRC-e ICP-MS using standard dilution and digestion procedures.

Metal nanostructures are of great interest owing to their potential applications in catalysis, plasmonics, energy harvesting, nanomedicine, and more. Their unique properties arise from nanoparticle shape, composition, and crystallite size. Likewise, bimetallic nanostructures often display size- and shape-dependent properties, where the bimetallic distribution (e.g., heterostructure vs. alloy) itself contributes to the properties that are displayed. An important consideration in the synthesis of metallic nanostructures is the ability to precisely control the composition and structure of nanocrystals through both the underlying chemistry and processing conditions. For example, single-crystalline Pd octahedra, icosahedra with twin planes, and nanoplates with stacking faults were synthesized selectively by Xia and coworkers by changing the polyol used to reduce a metal salt and/or the reaction temperature. By varying these two reaction parameters, the reduction kinetics of the metal precursor were controlled, thus allowing different synthetic outcomes through manipulation of the underlying chemistry.

The role of process conditions on nanomaterial structure is less well studied, although recent work has shown that the growth mode of a metal precursor onto metal seeds depends on the rate that the precursor is introduced and reduced in a batch reactor. Nanocrystal syntheses conducted in batch reactors do not scale linearly due to their sensitivity to thermal and composition gradients. In fact, attempts to scale-up batch reactions often result in loss of size and morphology control of the nanocrystals. The sensitive nature of batch reactions to scale-up has led to increasing interest in continuous-flow and droplet microreactors. Such platforms also enable inline analyses by interfacing analytical techniques to the microreactor. Continuous flow is defined as an uninterrupted single phase, driven only by the pressure at which the reactant streams are injected. The flow of the liquids is laminar, with mixing only occurring by diffusion. In addition, the flow of solutes is parabolic, with the liquid in the center of the parabola moving appreciably faster than the liquids along the walls of the vessel, which results in uneven reactions times as a function of position. These factors have, in part, driven the modification of continuous flow systems into continuous flow droplet reactors. Typically, two immiscible phases, e.g., water and silicone oil, are injected into an enclosed reaction vessel in order to generate a line of discrete droplets that are limited by the volume of the reactants and carrier phase. Droplets move by either droplet mode, plug mode, or slug mode, with the droplets themselves commonly being generated through flow focusing, cross-flow, or co-flow configurations. By creating droplet reactions from two immiscible phases, microreactor syntheses have the capability to produce a variety of products. Monometallic nanostructures, such as Pd cubes, and bimetallic systems, such as Pd@Au, Pd—Pt, and Pd—Ag nanostructures, have been synthesized in continuous-flow reactors; however, the growth of metal on seeds has not been well-controlled by an inline method.

The embodiments described herein incorporate the use of a continuous flow droplet microreactor, where the shape and dimensions of the bimetallic nanoparticle product can be controlled by adjusting the relative flow rates at which the reactant solutions are injected to form droplets. This ability is demonstrated with the synthesis of shape-controlled core@shell Au@Pd nanoparticles, with the flow approach being adapted from a batch reaction approach where shell thickness was manipulated by either varying the amount of potassium tetrachloropalladate ($K_2PdCl_4$) or Au seeds in solution. Through the use of a droplet microreactor, the reaction volume was reduced by a factor of 900 (from 9 mL to 10 µL), although larger or smaller sized reaction droplets could be achieved through the use of different sized tubing and flow conditions. The large change in volume is attributed to the carrier medium, silicone oil, separating the aqueous phase into discrete reaction droplets. By injecting the oil phase into the reactor at a rate of 1-2 times faster than the summation of the 3 aqueous phase flow rates used in this demonstration, uniform and evenly spaced reaction droplets are produced.

This configuration allows for elucidation of the role relative flow-rates have on the microreactor synthesis of core@shell nanocrystals using Au@Pd as a model system. Of particular interest is that by adjusting the flow-rate of the Pd precursor relative to the flow-rate of the Au cubic seeds, conformal Pd shells with controllable thicknesses were obtained. Also, dendritic Pd shells with variable thicknesses resulted with Au octahedral seeds. As the flow-rate of Pd precursor increases relative to that of the Au seeds, so does the supersaturation level of Pd. Connecting process conditions to fundamental principles of nanocrystal formation enables facile manipulation of synthesis conditions to achieve predictable outcomes. These results provide guidelines on how the core@shell structure can be manipulated by changing the relative flow-rates of precursors using a microreactor and should be applicable to other core@shell and seeded systems in general.

Experimental Section

Chemicals

Gold (III) chloride trihydrate ($HAuCl_4 \cdot 3H_2O$, 99.9%), hexadecyltrimethylammonium bromide (CTAB, BioUltra, 99.0%, Lot #BCBP3807V), sodium borohydride ($NaBH_4$, granular, 99.99%), L-ascorbic acid (L-aa, $C_6H_8O_6$, crystalline, BioXtra, 99.0%), sodium citrate (HOC(COONa)($CH_2COONa)_2 \cdot 2H_2O$, Batch #020M0026), cetyltrimethylammonium chloride solution (CTAC, 25 wt. % in $H_2O$, Lot #STBF7177V), sodium tetrachloropalladate(II) ($Na_2PdCl_4$, 99.99%, Lot #MKBX6718V), palladium(II) chloride ($PdCl_2$, 99.9%, Lot #MKBV5028V), and methanol ($CH_3OH$, anhydrous, 99.8%) were purchased and used as received. Sodium bromide (NaBr, 99.99%) was purchased and used as received. Hydrochloric acid (HCl, 1.0 N) and chloroform ($CHCl_3$, ACS) were purchased and used as received. Silicone oil (Lot #166612) was purchased and used as received. Milli-Q nanopure water (18.2 MΩ·cm) was used in all experiments.

Synthesis of Au Nanocubes.

First, Au seeds were prepared by mixing 0.25 mL of 10 mM $HAuCl_4*3H_2O$ and 7.5 mL of 100 mM CTAB in a 30 mL reaction vial. To this, 0.6 mL of freshly prepared 10 mM $NaBH_4$ was added, and the vial was capped and mixed by inversion for two minutes before being placed in an oil bath at 25° C. for one hour. After this time, the Au seeds were diluted 10-fold. Into a separate 30 mL vial, 0.20 mL of 10 mM $HAuCl_4*3H_2O$, 8 mL water, and 1.6 mL of 100 mM CTAB were mixed by inversion. To this, 0.95 mL of 100 mM L-aa was added followed by 5 µL of the dilute Au seed solution. The reaction vial was capped, mixed by inversion, and allowed to sit undisturbed in an oil bath at 25° C. for one hour. The Au cubes were collected by centrifugation after 15 minutes and diluted to a volume of 3 mL with water.

Synthesis of Au Octahedra.

Into a 30 mL reaction vial, 1.5 mL of 100 mM CTAB, 8.2 mL of water, 0.25 mL of 10 mM $HAuCl_4 \cdot 3H_2O$ and 0.05 mL of 100 mM sodium citrate were mixed by inversion. The vial was placed in an oil bath preheated to 110° C. and left undisturbed for 24 h. Au octahedra were collected by centrifugation for 15 minutes and diluted to a volume of 3 mL with water.

Preparation of $H_2PdCl_4$.

An aqueous solution of 10 mM $H_2PdCl_4$ was prepared by dissolving 44.6 mg of $PdCl_2$ in a 25 mL solution of HCl (pH adjusted to 1.69). The solution was stirred for approximately 1 hour at 70° C.

Design of Microreactor for Core@Shell Syntheses.

Four syringes placed on four different syringe pumps (KD Scientific Inc.) were connected to polytetrafluoroethylene (PTFE) tubing (I.D.=1.58 mm) through silica capillaries (I.D.=0.250 mm) and held in place by epoxy. These capillaries were placed such that the end of the capillaries met at the same point at the injector site. Around five feet of tubing was placed into the oil bath so that an overall heating time of 2 hours could be met by the overall flowrate of the individual reaction droplets. The droplets were then collected in a centrifuge vial after exiting the tubing.

Synthesis of Au@Pd Particles.

Core@shell Au@Pd particles were synthesized using 4 syringe pumps 130 to deliver 4 solutions and generate the continuous flow droplet reactor. Three syringes 132 contained reagents and the forth 134 contained silicone oil as the carrier medium (FIG. 12). Syringe 1, SP1, contained a range of aqueous solutions varying from 0.25-1.00 mM $H_2PdCl_4$ for the concentration study (as denoted in the main text) and 0.50 mM $H_2PdCl_4$ for each flow-rate study along with 144 mM CTAC and 64.8 mM NaBr. The NaBr was omitted when Au octahedral seeds were used. The second syringe, SP2, contained an aqueous 3 mL solution of Au nanocubes (0.60 mM Au determined by ICP-MS) or Au octahedra (0.67 mM Au determined by ICP-MS). A full study of seed concentration effects was not undertaken, but the overall yield of nanoparticles is governed by the concentration of seeds in SP2 as one seed produces one core@shell nanoparticle. The third syringe, SP3, contained an aqueous 3 mL solution of 10 mM L-aa. The fourth syringe, SP4, contained 10 mL of silicone oil. During the concentration studies, the flow-rates for SP1 and SP2 were each 0.3 mL/hr. For the flow-rate studies, the ratio between SP1:SP2 were: 1:2, 1:1, 2:1, and 5:1, with the combined additive flow rate of the two syringe pumps equal to 0.6 mL/hr. The flow-rate of SP3 was set at 0.1 mL/hr and SP4 was set at 1.0 mL/hr for all experiments. The total additive flowrate of the reagents was 0.7 mL/hr when including the constant flowrate of the L-aa solution. This additive flowrate was held constant to ensure that the different reactions occurred in droplets of the same size, 10 µL. By using the ratio of each reagent's flowrate into the microreactor, the concentrations of reagents within an individual droplet can be calculated and are summarized in FIGS. 13 and 14. The yields of products collected in the vial 142 are governed by the overall flowrate and concentration of Au seeds in SP2 as one seed produces one core@shell particle. The temperature of the oil bath 140 was set to 55° C. for the synthesis of both the Au@Pd cubes and Au@Pd octahedra. After collection of the particles, the silicone oil layer sat on top of the aqueous layer which contained the particles. The aqueous layer was removed by pipette and the product collected by centrifugation. The supernatant was removed, the sample redispersed in water, then collected again by centrifugation. This washing procedure was conducted 3 times.

Characterization

Samples for scanning electron microscopy (SEM) were prepared by drop-casting a dispersed particle solution onto a cleaned Si wafer. After the solvent evaporated, the Si wafers were washed with methanol several times to remove excess surfactant. Images were obtained with a FEI Quanta FEG 600 field-emission environmental SEM. For transmission electron microscopy (TEM), samples were prepared by drop-casting a dispersed particle solution onto a carbon-coated copper grid (Ted-Pella). After 5 minutes, the grid was dipped in methanol and allowed to air dry for 30 minutes. A JEOL JEM 1010, equipped with a ROM CCD camera, was used to acquire TEM images.

For high-resolution transmission electron microscopy (HRTEM), selected area electron diffraction (SAED), and scanning transmission electron microscopy (STEM), a dispersed particle solution was drop-casted on a 300 mesh Cu grid (Ted-Pella, Formvar removed by dipping grid in chloroform). After 5 minutes, the grid was dipped in methanol, air dried for 30 minutes and then soaked in acetone overnight. Sample analysis by HRTEM, SAED and STEM were conducted on a JEOL JEM 3200FS TEM, equipped with a Gatan 4 k×4 k UltraScan 4000 CCD camera, operating at 300 kV with a spot size of 1. Energy dispersive X-ray spectroscopy (EDS) spectra were obtained with a liquid nitrogen cooled Oxford INCA dispersive X-ray system interfaced to the JEOL JEM 3200FS TEM. Elemental mapping was conducted in STEM-EDS mode. ICP-MS analysis of the Au seed solutions was carried out using a PerkinElmer SCIEX ELAN DRC-e ICP-MS using standard dilution and digestion procedures.

Results and Discussion

The objective of this study was two-fold: to synthesize high-quality core@shell nanomaterials with a continuous flow droplet reactor and to demonstrate inline manipulation of structural parameters central to the properties of core@shell nanomaterials, e.g., shell thickness. Central to achieving these goals is an ability to vary the supersaturation within droplets without having to modify the concentrations of the feedstock solutions. Thus, the disclosed embodiments sought to manipulate the relative flow rates of the Pd precursor solution relative to that of the Au seeds, causing larger shell thicknesses with increasing Pd precursor supersaturation. FIG. 12 shows a scheme of the continuous-droplet microreactor used to synthesize these nanostructures. Four syringes were coupled to four syringe pumps so that each reagent and the carrier medium could be injected at different flow rates and independently manipulated. The microreactor used in the study generates droplets via dripping and is of a co-flow configuration, where all reagent capillaries meet at the same point inside PTFE tubing. Size measurements of the droplets can be estimated by the ratio of flow-rates between the reactants and carrier medium, Equation (1), $$\frac{L}{w} = \frac{\alpha Q_{reaction}}{Q_{carrier}}, \quad \text{Equation (1)}$$

where L is the length of the droplet containing the reactants, w is the inner diameter of the PTFE tubing, α is a constant dependent on junction geometry, $Q_{reaction}$ is the flow-rate of the reactants and $Q_{carrier}$ is the carrier medium flow rate. The flow-rate for the carrier medium, silicone oil, was held at 1.0 mL/hr as a higher flow rate through the small silica capillaries was detrimental to the reactor. Syringe 1 (SP1) contained an aqueous solution of CTAC, Pd precursor, and NaBr, with the CTAC and NaBr serving as stabilizing and capping agents during nanoparticle growth. Syringe 2 (SP2) contained an aqueous solution of Au seeds, either nanocubes or octahedra. When Au octahedra were used as seeds, NaBr was omitted from SP1 as discussed later. Syringe 3 (SP3) contained an aqueous solution of L-aa. The isolation of L-aa, the reducing agent, in a separate syringe prior to droplet formation is important to high quality nanomaterial formation as it may be oxidized by Au seeds or facilitate premature reduction of the Pd precursor before droplet formation. The fourth syringe (SP4) contained silicone oil, which was used to separate the combined reagents into individual droplets. At the injector site, the ends of the four capillaries were placed evenly such that, when the reagent material flowed into the PTFE tubing, droplets could form through flow-focusing and passive mixing. The PTFE tubing which contained the flowing droplets was held in a temperature controlled oil bath. Based on Equation 1 and process conditions, the volume of the droplets was estimated at 10 μL and their residence time within the heating zone was 2 hours.

As an initial demonstration of Au@Pd nanostructure synthesis using Au nanocubes as seeds, the reagent flow rates, denoted as R1 (for SP1) and R2 (for SP2), were held at 0.3 mL/hr. In order to increase the Pd shell thickness, the amount of $H_2PdCl_4$ in the syringe on SP1 was increased from 0.25 mM to 0.50 mM to 0.75 mM to 1.00 mM, while keeping all other reagents constant. $H_2PdCl_4$, instead of sodium tetrachloropalladate ($Na_2PdCl_4$), was chosen as the palladium precursor as the use of $Na_2PdCl_4$ facilitated Pd particles by homogeneous nucleation in addition to seeded growth; the lower solution pH of $H_2PdCl_4$ compared to $Na_2PdCl_4$ reduces supersaturation during shell growth on account of the pH-dependent reducing capabilities of L-aa (FIG. 15). The concentration study results are summarized in FIG. 16, which shows SEM, TEM, and elemental mapping by STEM-EDS of the product particles as a function of Pd precursor concentration. From the EM images, the vertices of the cubes can be seen to sharpen as the Pd precursor concentration increases, with characterization of the original seeds shown in FIG. 17 for comparison. This subtle change in morphology is accompanied with an increase in Pd shell thickness with increasing Pd precursor concentration, as evident from the elemental mapping. Along with an increase in sharpness of the Au@Pd cubes going from column A to D, small areas of asymmetric shell growth and homogeneously nucleated Pd can be observed with increasing concentration. Multiparticle TEM images (FIG. 18 A-D and FIG. 19) also show these outcomes, which can be hypothesized to arise from an increase in supersaturation levels and an insufficient amount of capping agent at higher precursor concentrations.

To test this hypothesis, the role of capping agent concentration on nanostructure quality was evaluated by repeating the experiment from column D but with double the amount of NaBr. The results are shown in column E (FIG. 16), with high quality Au@Pd cubes with sharp and symmetric shells achieved. Homogeneously nucleated Pd particles were not observed. This effect can be attributed to Br⁻ stabilizing the {100} facets of Pd as an increased concentration of Br⁻ is required for conformal and symmetric growth of increasingly large Pd shells. Thus, small changes in shell thickness are possible by changing the initial metal precursor amount when flow rates are held constant. However, in an industrial setting, this approach to changing shell thickness would require new feedstocks.

A more facile approach would be to change the process conditions inline, and this objective can be achieved by manipulation of the relative flow rates, as shown here. Based on the results shown in FIG. 16 our benchmark conditions align with Sample B and are reproduced in FIG. 20 as Sample B, where the flow rates of the Pd precursor, R1, and Au seeds, R2, are each 0.3 mL/hr. Going from column A to column D, the relative flow-rates were as follows: R1:R2=1:2, R1:R2=1:1, R1:R2=2:1, and R1:R2=5:1, with the combined additive flowrate of the two syringe pumps equal to 0.6 mL/hr. Unlike the concentration study in FIG. 16, additional NaBr was not needed here because both $H_2PdCl_4$ and NaBr were contained in the same syringe. Thus, increasing the concentration of $H_2PdCl_4$ in the droplets through relative flow rate increases the concentration of NaBr concomitantly. A trend of increasing Pd shell thickness can be observed when looking at the elemental mapping by STEM-EDS going from column A to column D. Increasing the R1 flow-rate relative to R2 allows for increasing the size of the Pd shells of the Au@Pd nanocubes in a conformal manner, although at a sufficiently high ratio (5:1), some homogeneous nucleation is observed and is consistent with the higher supersaturation conditions. A diagram that summarizes the dependence of Pd shell thickness on supersaturation and Pd:Au flowrate ratio is represented in FIG. 21.

Figure 2:
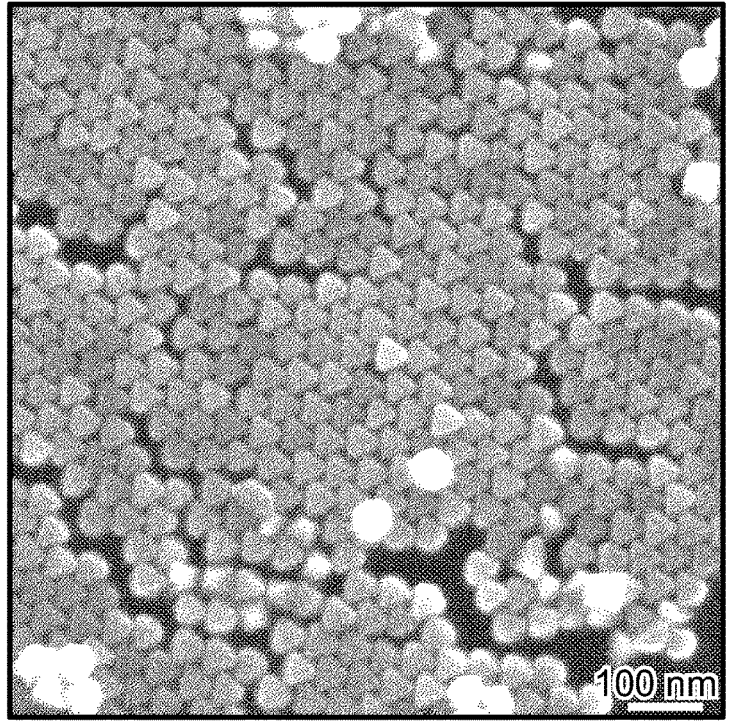
FIG. 2 is an SEM image of Au octahedral seeds used in the seed-mediated co-reduction syntheses.

To understand the bimetallic distribution in the Au@Pd nanocubes from the flow-rate study in greater detail, advanced characterization of HRTEM, SAED and elemental mapping by STEM-EDS was performed on individual cubes from FIG. 20. FIG. 22 displays the results from the R1:R2 of 2:1 flow-rate study (which corresponds to FIG. 20, column C sample). The HRTEM along with the SAED pattern taken through the center of the cube indicate that the nanocrystal is bound by {100} facets (FIG. 22A). A higher magnification image taken along the edge of the particle in FIG. 22A is shown in FIG. 22B. The image clearly shows the presence of lattice fringes of both the Au core and Pd shell. Additional evidence for a core@shell structure was obtained via STEM-EDS mapping, with a representative STEM image shown in FIG. 22C-1. The core@shell structure is identified through a difference in contrast of the two elements where the heavier element Au appears brighter than the lighter element Pd. The individual maps of Au and Pd are shown in FIGS. 22C-2 and 22C-3, with Au concentrated in the center of the nanostructure and Pd concentrated at the vertices and in thin layers along the faces. A mix of the Au and Pd maps is presented in FIG. 22C-4. From line scan analyses across these structures, the thickness of the Pd shells can be estimated at 2.8 nm. Similar analysis were done for the other samples in FIG. 20 (FIGS. 23-25), where the thickness of the Pd shells was shown to quantitatively increase with increasing Pd:Au flowrate ratio (FIG. 26).

The ability to manipulate shell thicknesses in microreactor syntheses of core@shell nanostructures through relative flow rates was further studied by repeating the flow-rate study as before but with {111} faceted Au octahedra, FIG. 17, used as seeds. NaBr was omitted given its propensity to stabilize {100} facets, but other conditions were held constant. HRTEM and STEM-EDS mix maps of the resultant Au@Pd octahedra are shown in FIG. 27. Notably while the R1:R2 ratio increased from 1:2 to 5:1, with the combined additive flowrate of the two syringe pumps equal to 0.6 mL/hr, the Pd shell thickness increased, but the growth was dendritic. A diagram depicting the increasing Pd shell thickness on Au octahedra with increasing relative flow-rate is also represented in FIG. 26. No homogeneously nucleated Pd was evident even in the R1:R2 of 5:1 study. This observation suggests a different growth mechanism compared to the synthesis of the Au@Pd cubes and indicates that the $H_2PdCl_4$ is reducing at a much higher rate during the synthesis of the Au@Pd octahedra. This finding is consistent with the use of CTAC exclusively, as the Br$^-$ used in the synthesis with Au nanocubes can exchange with Cl$^-$ from $H_2PdCl_4$ and slow precursor reduction. This precursor kinetic effect is coupled with a difference in seed capping, where empirical trends suggest Br$^-$ stabilizes {100} facets more effectively than {111} facets. We note that CTAB was not used in these studies because the high concentrations required for high quality nanostructure formation clogged the capillaries used with this microreactor.

Conclusions

Continuous flow droplet reactors are a route to architecturally controlled core@shell nanostructures. This manuscript reports the first study where relative flow-rates in a microreactor were manipulated in order to control shell thickness of core@shell nanostructures using Au@Pd as a model system. The flow-rate study for the {100} faceted cubic system showed an increase in conformal shell thickness by increasing the relative flow-rate of the Pd precursor with respect to the Au cubic seeds. A similar study using {111} faceted Au octahedra as seeds also resulted in an increase of Pd shell thickness; however, the shell grew dendritically.

These results illustrate that manipulating structurally defined core@shell nanostructures is possible inline by varying the relative flow rates in continuous flow droplet reactors. Of course, the flowrates of other reagents could be manipulated to facilitate changes in nanostructure morphology (e.g., seed concentration). These changes may result in different sized droplets or reducing conditions, which need to be considered in the experimental design. The products synthesized in this experiment are qualitatively analogous to products produced in similar batch reactions using comparable concentrations of reagents. Thus, the continuous nature of the method and ability to modify conditions inline are the primary advantages of the microreactor synthesis. By advancing the synthetic range for a continuous flow droplet reactor, new and more complex structures should be possible which could allow for the industrial production of large quantities of complex nanostructures.

Fabricating Nanostructures with Multi-Step Bioreactor

The synthesis of bimetallic NPs in continuous-flow droplet microreactors is a promising alternative to batch reactions. These microreactors pump reagent materials into flow-tubing at a constant rate to produce a continuous flow of droplets in which reactions proceed. Central to the generation of reaction droplets is the selection of two immiscible phases which are simultaneously injected into the flow-tubing at an optimal ratio. Droplets can move by either droplet mode, plug mode, or slug mode, with reagent material in the droplets mixing through diffusion during the laminar flow. Mass transport (e.g., diffusion, convection, migration) control is more easily achievable in microreactor droplet reactions due to smaller reaction volumes compared to that of batch reactions. In addition, the continuous production of reaction droplets makes the production of large quantities of product feasible.

The advantages of microreactors for metal NP syntheses has led to many microreactor designs and different metal NP products being achieved. Different heating elements, the hydrophobicity of reactor material, online temperature and flowrate manipulations, and the selected chemistry have all been shown to be important to achieving a desired product. However, these microreactors are typically limited to one synthesis inline, which could prohibit the continuous flow production of many architecturally controlled NPs as they are traditionally produced by sequential batch processes wherein NP seeds are produced first. A recent study showed the possibility of sequential reactions inline for the synthesis of core@shell Au@Pd NPs. First, Au NP seeds were synthesized inline followed by a Pd overgrowth step where the reagents required for overgrowth were introduced into the droplets containing Au NP seeds by using electrocoalescence. Electrocoalescence is the process of enhancing droplet coalescence with a variable electric field. While the electrocoalescence methodology enhances synthetic strategies, reagent addition is limited to the presence of an electric field. In addition, the presence of an electric field can manipulate growth kinetics and could be responsible for the dendritic shell achieved in the study.

As described herein, a duo-microreactor for architecturally defined bimetallic NP syntheses is capable of sequential reactions and avoids the effects of an electric field on NP growth. All reagent materials are confined in the aqueous phase and all mixing processes happen in laminar flow. The duo-microreactor synthesizes metal NP seeds first followed by a secondary metal that is deposited inline. The versatility of using different metals in the system and the precise architectural control of the NP products make the microreactor methodology a significant advance.

Results and Discussion

The methods described herein have two objectives: to construct a duo-microreactor capable of sequential reactions critical to achieving architecturally defined bimetallic NPs and to use the reactor to synthesize a variety of bimetallic NPs with defined architectures. FIG. 29 shows a scheme of the duo-microreactor 200 built for this study. The microreactor uses six syringes 202 placed on six syringe pumps 204 containing the media used for achieving the aqueous droplet reactions. The syringes were connected to PTFE tubing 206 by silica capillaries 208. Droplet generation was achieved from a two-phase flow in a continuous manner, where symmetric droplet formation was controlled by maintaining a constant total additive flowrate ratio between the aqueous reagents and the carrier medium (silicone oil).

Microreactor Design (1$^{st}$ Segment)

The duo-microreactor can be broken into two segments, with each designed to achieve a different reaction. The first segment 220 is where cubic Pd seeds were synthesized using three of the six total syringe pumps. This segment is shown on the left half of FIG. 29. Two syringes contain aqueous reagents and a third syringe contains immiscible silicone oil. Syringe pump 1, SP1, holds a syringe solution of 610.0 mM KBr, 175.5 mM L-aa, and 139.1 mM PVP. Syringe pump 2, SP2, holds a syringe solution of 35.0 mM $Na_2PdCl_4$ and 139.0 mM PVP. The silicone oil syringe pump holds a syringe of silicone oil. The flowrates of the seed reaction solutions are 1.8, 1.8, and 1.2 mL/h for SP1, SP2, and the silicone oil pump, respectively. The residence time is approximately 40 minutes at 80° C. for the seed reaction droplets in a primary oil bath 250, with the product from the seed reaction either being collected for analysis or continuing downstream to the second segment of the reactor.

Cubic Pd Seeds

A TEM image of the Pd cubes with a face diagonal of 12.6±1.5 nm produced in the first half of the reactor is shown in FIG. 30. No modifications were made to the seed reaction throughout the entire experiment. Notably, cubic Pd seeds can be synthesized in a single aqueous phase flow, but the system does not create sequential reactions as the product would crash out of the solution and clog the reaction tubing line. Rather, a slow stream of silicone oil facilitates droplet formation and keeps the reagents and the product flowing to produce high quality Pd seeds.

Microreactor Design ($2^{nd}$ Segment)

The second segment 222 of the reactor is where overgrowth reactions onto the Pd seeds occur, requiring the use of three syringe pumps to deliver additional reagents to the droplets containing the seeds. This segment is shown on the right half of FIG. 29. Specifically, droplets containing cubic Pd seeds are fed into the overgrowth reaction segment through a Y-junction adapter 230. In this junction, the droplets are met with an aqueous stream of reagents, which elongates the original droplets due to the added volume. Mixing is achieved through diffusion within the new, elongated aqueous droplets. These elongated droplets flowed out of the Y-junction and into a secondary Y-junction where they are broken up into smaller droplets through the addition of more silicone oil; smaller overgrowth reactions droplets allow for better control of temperature and mass transport. These droplets containing Pd cubic seeds and overgrowth reagents are fed into a secondary oil bath 252. After completion of the overgrowth reaction, the droplets exit the tubing and are collected in a vial 254. For the overgrowth step, both Au and Pt deposition are analyzed in order to demonstrate generality.

Pd—Pt Nanodendrites

Considering Pt deposition, branched Pd—Pt nanostructures are synthesized in the overgrowth reaction segment of the duo-microreactor. In the overgrowth segment of the microreactor, syringe pump 3, SP3, holds a syringe solution of 4.1-36.6 mM $K_2PtCl_4$ and 3.0 mM PVP. Syringe pump 4, SP4, holds a syringe solution of 0.2 mM KBr, 4.5-40.2 mM L-aa, and 3.1 mM PVP. The latter silicone oil syringe pump, connected through a secondary Y-junction, pumps silicone oil to break up the elongated droplets generated from adding more aqueous solution. The flowrates of the overgrowth reaction solutions are 1.8, 1.8, and 9.5 mL/h for SP1, SP2, and the silicone oil pump, respectively. The relatively high flowrate of the silicone oil is also used to achieve a residence time of ~10 minutes at 80° C. for the overgrowth reaction droplets. Low to high concentrations of L-aa and $K_2PtCl_4$ are evaluated to control the amount of Pt deposition onto the Pd seeds, with higher concentrations leading to more Pt being deposited. TEM images of the increasing Pt deposition onto the cubic Pd seeds can be seen in FIG. 30B-F, with the lowest Pt concentration corresponding to FIG. 30B and the highest Pt concentration corresponding to FIG. 30F. Upon increasing the starting concentrations of L-aa and $K_2PtCl_4$ in the reagent syringes and maintaining constant flowrates, more deposited Pt metal becomes easily apparent at the tips. Exact concentrations for each reaction can be found in FIG. 31. At high supersaturation (FIG. 30E-F), multi-branched Pd—Pt NPs are achieved.

To show localization of Pd and Pt on the final multimetallic NPs, HRTEM, STEM, and elemental mapping images were taken of two Pt deposition samples. FIG. 32, row A shows the detailed analysis of an individual NP from the sample shown in FIG. 30D. The STEM image shows indication that the Pt deposition is localized to the vertices of the Pd cube as seen by the different atomic contrast at the corners. This distribution is further confirmed by the elemental mapping where the blue representation of Pt is localized to the corners of the red cube in the mixed image. A line scan in FIG. 33 represents this claim, as well. The average length of these particles from tip to tip across the diagonal was 15.0±1.6 nm, a 2.5 nm increase from the Pd cubes. FIG. 32, row B shows the detailed analysis of an individual NP from the sample shown in FIG. 30F. The STEM image indicates that the Pt deposition is localized to the vertices, but multi-branching is evident with increased Pt deposition. This distribution is further confirmed by mixed elemental map where the Pt multi-branches are shown in blue at the vertices of the red Pd cube. FIG. 34 confirms this with a line scan. Multiparticle elemental mapping images of samples correlating to FIG. 30C, FIG. 30D, and FIG. 30F can be seen in FIG. 35. Similar Pd—Pt nanostructures have been synthesized in batch reactions and have shown enhanced activity toward the oxygen reduction reaction (ORR).[16] Pd—Pt nanodendrites are achieved by kinetically trapping the Pt adatoms at high energy sites on the Pd cubes with the aid of L-aa as the reducing agent.

Pd@Au Core@Shell Spheres

Gold deposition onto the cubic Pd seeds was also achieved in the duo-microreactor, producing core@shell Pd@Au NPs. During the overgrowth segment, two syringes contained aqueous reagents and a third syringe contained immiscible silicone oil. Specifically, syringe pump 3, SP3, held a syringe solution of 4.1 mM $HAuCl_4$ and 3.0 mM PVP. Syringe pump 4, SP4, held a syringe solution of 0.2 mM KBr, 4.5 mM L-aa, and 3.1 mM PVP. The latter silicone oil syringe pump held a syringe of silicone oil. The flowrates of the overgrowth reaction solution were 1.8, 1.8, and 9.5 mL/h for SP1, SP2, and the silicone oil pump, respectively. The residence time was ~10 minutes at 60° C. for the overgrowth reaction droplets. The core@shell Pd@Au NPs are characterized in FIG. 36 with TEM, STEM, and elemental mapping images. After the Au overgrowth reaction, the overall morphology of the NPs became more spherical than cubic as seen in FIG. 36B and in the STEM image in FIG. 36. This mode of deposition has been observed previously with a prior Pd and Au microreactor synthesis, but that system combines batch products with microreactor reactions. Elemental mapping confirms the core@shell architecture, with preservation of the cubic Pd seeds in the interior. In the mixed mapping image, the yellow representation of the Au surrounds the red representation of the Pd showing the core@shell architecture. This distribution is also evident from line scan analysis in FIG. 37. Multiparticle elemental mapping images of the Pd@Au core@shell sample can be found in FIG. 38.

As the synthesis of Pd—Pt dendrites and core@shell Pd@Au NPs illustrates, we have designed a duo-microreactor capable of synthesizing seeds followed by overgrowth of a secondary metal and demonstrated the generality of this method using different metals. When considering a system in this duo-reactor, we chose systems that had similar reagents in the seed reaction and in the overgrowth reaction because our seeds could not be washed inline. Using different reagents for the seed and overgrowth reactions, without first washing the seeds, would likely make it difficult to identify how the reagents are affecting the NP growth. Furthermore, multiple reduction and growth pathways could occur with overlapping reagents in solution. When considering a system in this dueo-reactor, chemistry is chosen where the seed reaction went to completion, leaving no Pd seed precursor in solution downstream. This selection prevented any Pd deposition in the overgrowth step. By considering these compatibility issues, other architecturally defined NPs can be prepared in microdroplets through sequential reactions.

Conclusion

Microreactors for NP synthesis are being explored because of their advantages over batch reactions, especially regarding scale-up properties. However, most of these microreactors only allow for a single inline reaction. This study reports a duo-microreactor with the capability of inputting metal precursor solutions and achieving architecturally controlled bimetallic particles inline, while also controlling the shape and dimensions of the NPs. Pd—Pt branched structures and core@shell Pd@Au particles have been achieved using this duo-microreactor. This methodology can be applied to other bi- and multi-metallic NP systems and should expedite production of these materials as well as studies of their formation mechanism through integrated spectroscopies.

Experimental Section

Chemicals

Gold (III) chloride trihydrate ($HAuCl_4 \cdot 3H_2O$, 99.9%, Lot #MKCH4806), L-ascorbic acid (L-aa, $C_6H_8O_6$, 99.0%, Lot #BCBS0460V), polyvinylpyrrolidone (($C_6H_9NO)_n$, $M_w$~55,000, Lot #MKBW1858V), potassium bromide (KBr, 99.0%, Lot #BCBW6864), potassium tetrachloroplatinate (II) ($K_2PtCl_4$, 98.0%, Lot #MKCF9423), and sodium tetrachloropalladate(II) ($Na_2PdCl_4$, 99.99%, Lot #MKBX6718V) were purchased and used as received. Silicone oil (Lot #178869) was purchased and used as received. Milli-Q nanopure water (18.2 MΩ·cm) was used in all experiments.

Design of Duo-Microreactor for Seed and Overgrowth Syntheses

The design of the duo-microreactor was adapted from various microreactors reported in the literature. Six syringes placed on six different syringe pumps were connected to polytetrafluoroethylene (PTFE) tubing (I.D.=1.58 mm) through silica capillaries (I.D.=0.250 mm) and held in place by epoxy. The capillary lengths and tips were cut and placed such that the ends of the capillaries met at the same point at the injector sites. A seed reaction segment was placed at the start of the duo-microreactor followed by an overgrowth reaction segment. The seed and overgrowth segments were connected inline through a connector Y-junction (I.D.=4.76 mm). Also, a latter stream of silicone oil to break up overgrowth reaction droplets was connected to the reactor through a connector Y-junction (I.D.=4.76 mm). Three reagent syringes were utilized for both the seed and overgrowth reactions. Approximately five feet of tubing and three feet of tubing were placed into the seed and overgrowth oil baths, respectively. The droplets were then collected in a centrifuge vial after exiting the tubing.

Synthesis of Pd Nanocubes

Pd nanocubes were synthesized in the seed reaction segment of the duo-microreactor similarly to a literature protocol. Two syringes contained aqueous reagent materials and a third syringe contained immiscible silicone oil. Syringe pump 1, SP1, held a syringe solution of 610.0 mM KBr, 175.5 mM L-aa, and 139.1 mM PVP. Syringe pump 2, SP2, held a syringe solution of 35.0 mM $Na_2PdCl_4$ and 139.0 mM PVP. The silicone oil syringe pump held a syringe of silicone oil. The flowrates of the seed reaction solutions were 1.8, 1.8, and 1.2 mL/h for SP1, SP2, and the silicone oil pump, respectively. The temperature was 80° C. and the residence time was ~40 minutes for the seed reaction droplets. Exact concentrations in the reaction droplets can be found in FIG. 39.

Synthesis of Pd—Pt Branched Structures

Pd—Pt branched structures were synthesized in the overgrowth reaction segment of the duo-microreactor. Two syringes contained aqueous reagent materials and a latter third syringe contained immiscible silicone oil. Syringe pump 3, SP3, held a syringe solution of 4.1-36.6 mM $K_2PtCl_4$ and 3.0 mM PVP. Syringe pump 4, SP4, held a syringe solution of 0.2 mM KBr, 4.5-40.2 mM L-aa, and 3.1 mM PVP. The latter silicone oil syringe pump held a syringe of silicone oil. The concentration ranges of L-aa and $K_2PtCl_4$ were utilized for a concentration/deposition study. The flowrates of the overgrowth reaction solutions were 1.8, 1.8, and 9.5 mL/h for SP1, SP2, and the silicone oil pump, respectively. The temperature was 80° C. and the residence time was ~10 minutes for all overgrowth reaction droplets. Exact concentrations in the overgrowth reactions can be found in FIG. 31. Final products were washed 3x with an ethanol/water mixture.

Synthesis of Pd@Au Core@Shell Structures

Pd@Au core@shell NPs were synthesized in the overgrowth reaction segment of the duo-microreactor similarly to a literature protocol. Two syringes contained aqueous reagent materials and a latter third syringe contained immiscible silicone oil. Syringe pump 3, SP3, held a syringe solution of 4.1 mM $HAuCl_4$ and 3.0 mM PVP. Syringe pump 4, SP4, held a syringe solution of 0.2 mM KBr, 4.5 mM L-aa, and 3.1 mM PVP. The latter silicone oil syringe pump held a syringe of silicone oil. The flowrates of the overgrowth reaction solutions were 1.8, 1.8, and 9.5 mL/h for SP1, SP2, and the silicone oil pump, respectively. The temperature was 60° C. and the residence time was ~10 minutes for all overgrowth reaction droplets. Exact concentrations in the overgrowth reactions can be found in FIG. 31. Final products were washed 3x with an ethanol/water mixture.

Characterization

For transmission electron microscopy (TEM), samples were prepared by drop-casting a dispersed particle solution onto a carbon-coated copper grid (Ted-Pella). After 5 minutes, the grid was dipped in methanol and allowed to air dry for 30 minutes. A JEOL JEM 1010, equipped with a ROM CCD camera, was used to acquire TEM images.

For high-resolution transmission electron microscopy (HRTEM) and scanning transmission electron microscopy (STEM), a dispersed particle solution was drop-casted on a 300 mesh Ni grid. After 5 minutes, the grid was dipped in methanol, air dried for 30 minutes and then soaked in acetone overnight. Sample analysis by HRTEM and STEM were conducted on a JEOL JEM 3200FS TEM, equipped with a Gatan 4 k×4 k UltraScan 4000 CCD camera, operating at 300 kV with a spot size of 1. Energy dispersive X-ray spectroscopy (EDS) spectra were obtained with a liquid nitrogen cooled Oxford INCA dispersive X-ray system interfaced to the JEOL JEM 3200FS TEM. Elemental mapping was conducted in STEM-EDS mode.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A microreactor comprising:
a plurality of syringes, each syringe placed on a syringe pump;
tubing connected to each syringe;
capillaries connected to the tubing, an end of the capillaries meeting at an injector site of a respective syringe; and
a heating element, the tubing positioned in the heating element to heat the tubing, wherein droplets from the tubing are collected in a centrifuge vial after exiting the tubing.

2. The microreactor of claim 1, wherein the plurality of syringes includes four syringes.

3. The microreactor of claim 2, wherein three of the four syringes contain reagents and one of the syringes contains silicone oil.

4. The microreactor of claim 3, wherein a flowrate of a reagent through the tubing is 1.8 mL per hour.

5. The microreactor of claim 3, wherein a first reagent includes $H_2PdCl_4$.

6. The microreactor of claim 5, wherein a second reagent includes Au nanocubes.

7. The microreactor of claim 6, wherein a third reagent includes L-aa.

8. The microreactor of claim 1, wherein:
the tubing includes polytetrafluoroethylene; and
the capillaries include silica capillaries.

9. The microreactor of claim 1, wherein the tubing has an inner diameter of approximately 1.58 millimeters.

10. The microreactor of claim 1, wherein the capillaries have an inner diameter of approximately 0.250 millimeters.

11. The microreactor of claim 1, wherein the heating element has a temperature of approximately 55° C.

12. A method for nanoparticle synthesis comprising:
placing a plurality of syringes on a syringe pump;
connecting tubing to each syringe;
connecting capillaries to the tubing so that ends of the capillaries meet at an injector site of a respective syringe;
positioning the tubing in a heating element to heat the tubing;
controlling a flowrate of a reagent through the tubing; and
collecting droplets from the tubing in a centrifuge vial after exiting the tubing.

13. The method of claim 12, wherein placing a plurality of syringes on a syringe pump includes placing four syringes on the syringe pump.

14. The method of claim 13, further comprising:
filling three of the four syringes with reagents; and
filling one of the syringes with silicone oil.

15. The method of claim 14, wherein controlling the flowrate of a reagent through the tubing further comprises adjusting the flowrate of the reagent through the tubing to 1.8 mL per hour.

16. The method of claim 14, wherein filling three of the four syringes with reagents further comprises filling a first syringe with a reagent that includes $H_2PdCl_4$.

17. The method of claim 16, wherein filling three of the four syringes with reagents further comprises filling a second syringe with a reagent that includes Au nanocubes.

18. The method of claim 17, wherein filling three of the four syringes with reagents further comprises filling a third syringe with a reagent that includes L-aa.

19. The method of claim 12, wherein:
connecting tubing to each syringe further comprises connecting polytetrafluoroethylene tubing to each syringe; and
connecting capillaries to the tubing further comprises connecting silica capillaries to the tubing.

20. The method of claim 12, further comprising heating the heating element to a temperature of approximately 55° C.

* * * * *